United States Patent
Matsuura et al.

(10) Patent No.: US 8,295,386 B2
(45) Date of Patent: Oct. 23, 2012

(54) NONLINEAR FILTER AND TRANSMISSION CIRCUIT

(75) Inventors: Toru Matsuura, Osaka (JP); Kenichi Mori, Osaka (JP); Wayne S. Lee, San Mateo, CA (US)

(73) Assignee: Panasonic Corporation, Osaka (JP)

( * ) Notice: Subject to any disclaimer, the term of this patent is extended or adjusted under 35 U.S.C. 154(b) by 261 days.

(21) Appl. No.: 12/814,817

(22) Filed: Jun. 14, 2010

(65) Prior Publication Data

US 2011/0305292 A1 Dec. 15, 2011

(51) Int. Cl.
*H04L 27/02* (2006.01)
(52) U.S. Cl. ........ 375/268; 375/224; 375/226; 375/271; 375/296; 375/300; 375/302; 375/350; 455/108; 455/110; 455/114.2; 455/114.3; 455/115.1; 327/28; 327/129; 327/164; 327/165; 327/254; 370/483
(58) Field of Classification Search ............. 375/224, 375/226, 268, 271, 296, 300, 302, 350; 455/108, 455/110, 114.2, 114.3, 115.1; 370/483; 327/28, 327/129, 164, 165, 254
See application file for complete search history.

(56) References Cited

U.S. PATENT DOCUMENTS

| | | | |
|---|---|---|---|
| 7,054,385 B2 | 5/2006 | Booth et al. | |
| 7,248,639 B2 | 7/2007 | Rudolph et al. | |
| 2005/0107051 A1* | 5/2005 | Aparin et al. | 455/126 |
| 2009/0258612 A1 | 10/2009 | Zhuang et al. | |
| 2010/0246716 A1* | 9/2010 | Wang et al. | 375/298 |
| 2011/0051836 A1* | 3/2011 | Lee | 375/268 |

OTHER PUBLICATIONS

U.S. Appl. No. 12/414,016, filed Mar. 30, 2009.
U.S. Appl. No. 12/482,913, filed Jun. 11, 2009.
Raab, F. H., "High-Efficiency L-Band Kahn-Technique Transmitter", 1998 IEEE MTT-S Int. Microwave Symp. Digest, pp. 585-588.

* cited by examiner

Primary Examiner — Leon Flores

(57) ABSTRACT

A nonlinear filter includes: a determination unit that determines, based on I and Q signals inputted into the determination unit, whether or not to perform pulse insertion; a rotation detector that detects a rotation direction of the I and Q signals on an IQ plane with respect to the origin of the IQ plane; a pulse generator that generates, when the determination unit determines to perform the pulse insertion, a pulse of which at least one of the direction and the magnitude is determined in accordance with at least the detected rotation direction; and an adder that inserts the pulse into the I and Q signals and outputs resultant I and Q signals.

15 Claims, 19 Drawing Sheets

NONLINEAR FILTER AND TRANSMISSION CIRCUIT

BACKGROUND OF THE INVENTION

1. Field of the Invention

The present invention relates to a nonlinear filter to be used in radio communication devices such as mobile phones and wireless LAN devices.

2. Description of the Background Art

In general, a transmission circuit performs modulation by varying the amplitude and the phase of a carrier wave in accordance with an input signal, thereby generating a transmission signal. When variations of the transmission signal are observed on an IQ plane, it may be observed, depending on the modulation method, that the transmission signal passes near the origin of the IQ plane when transitioning from one symbol to another symbol. In such a case, the frequency band of the transmission signal is wide with respect to both the amplitude and phase components thereof. This causes a problem of, for example, interference with adjacent frequency bands.

In order to avoid such a problem, there is a known conventional technique called hole blowing. FIG. 17 shows a configuration of a nonlinear filter 1701 that performs a hole blowing process disclosed by Patent Document 1. The nonlinear filter 1701 includes a pulse shaping unit 1702, a delay unit 1703, a determination unit 1704, and a pulse generator 1706. An I signal (in-phase signal) and a Q signal (quadrature-phase signal) are inputted into the nonlinear filter 1701. The determination unit 1704 monitors variations of the I and Q signals on the IQ plane. When determining that the distances of the I and Q signals from the origin of the IQ plane are less than a predetermined value, the determination unit 1704 outputs an instruction signal to the pulse generator 1706 so as to instruct the pulse generator 1706 to output pulses. Based on the instruction signal, the pulse generator 1706 calculates an appropriate scale for the I signal and an appropriate scale for the Q signal, and outputs pulses of these scales. The respective pulses are added by the adder 1707 to the I and Q signals whose timings have been compensated for by the delay unit 1703, and the resultant I and Q signals are outputted as outputs from the nonlinear filter 1701. The outputted I and Q signals are, as compared to those having just been inputted into the nonlinear filter 1701, corrected by the added pulses so as to be directed away from the origin on the IQ plane. Note that the pulse shaping unit 1702 is provided at the input or the output of the nonlinear filter 1701, and performs pulse shaping.

FIG. 18 shows a configuration of a transmission circuit 1801 that includes the nonlinear filter 1701 as described above. The transmission circuit 1801 includes input terminals 1802 and 1803, the nonlinear filter 1701, a coordinate system converter 1804, LPFs (low-pass filters) 1805 and 1806, an angle modulator 1807, an amplitude modulator 1808, and an output terminal 1809.

I and Q signals are inputted into the nonlinear filter 1701 via the input terminals 1802 and 1803, respectively. The nonlinear filter 1701 performs the above-described process on the I and Q signals, and outputs the resultant I and Q signals. Based on the I and Q signals on which the hole blowing process has been performed, the coordinate system converter 1804 generates and outputs an amplitude signal and a phase signal. The amplitude signal is inputted into the amplitude modulator 1806 after being band-limited by the LPF 1805. The phase signal is inputted into the angle modulator 1807 after being band-limited by the LPF 1806. The angle modulator 1807 performs angle modulation based on the phase signal, thereby generating an angle-modulated signal. The angle-modulated signal is inputted into the amplitude modulator 1808. Based on the inputted amplitude signal, the amplitude modulator 1808 performs amplitude modulation on the angle-modulated signal to generate a transmission signal, and outputs the transmission signal via the output terminal 1809.

Owing to the above configuration, the transmission signal on the IQ plane is prevented from passing through a predetermined range from the origin. In this manner, the frequency band of the transmission signal can be suppressed from being widened.

CITATION LIST

Patent Document

Patent Document 1: U.S. Pat. No. 7,054,385

SUMMARY OF THE INVENTION

FIG. 19 shows spectra of the transmission signal of the transmission circuit 1801. In FIG. 19, the horizontal axis represents frequency and the vertical axis represents power. In FIG. 19, a solid line represents the spectrum of the transmission signal in the case where the pulse generator outputs pulses of large scales, and a dashed line represents the spectrum of the transmission signal in the case where the pulse generator outputs pulses of small scales. In either case, the power is peaked in a carrier wave band, and the power decreases on the higher and lower frequency sides with respect to the carrier wave band. The shape of each spectrum is substantially symmetrical. In a band near the carrier wave band, the power is less and the distortion reduction effect is greater in the case of the pulses of the small scales than in the case of the pulses of the large scales. However, in a frequency band that is higher or lower than the carrier wave band and that is distant from the carrier wave band, the power is less and the distortion reduction effect is greater in the case of the pulses of the large scales than in the case of the pulses of the small scales. Thus, there is a trade-off between a band near the carrier wave band and a band distant from the carrier wave band, in terms of distortion reduction.

Generally speaking, a reception signal that a mobile terminal receives from a base station has a frequency band assigned thereto that is higher than a frequency band assigned to a transmission signal that the mobile terminal transmits to the base station. In this situation, in order to prevent interference with the reception signal, a transmission circuit used in the mobile terminal is required to have better low-distortion characteristics on the higher frequency side with respect to the carrier wave than on the lower frequency side. Alternatively, there may be a case where better low-distortion characteristics are required on the lower frequency side with respect to the carrier wave than on the higher frequency side. However, due to the above-described reasons, it has been difficult for the conventional transmission circuit 1801 to uniformly improve distortion reduction characteristics on one of the higher and lower frequency sides with respect to the carrier wave band.

Therefore, an object of the present invention is to provide a nonlinear filter that is capable of uniformly improving distortion reduction characteristics in a transmission circuit over a range of desired frequencies higher or lower than the carrier wave band.

In order to achieve the above object, the present invention has features described below. A first aspect of the present invention is a nonlinear filter for inserting, based on an I signal and a Q signal inputted into the nonlinear filter, a pulse into the I signal and the Q signal, and outputting the resultant I and Q signals. The nonlinear filter includes: a determination unit that determines, based on the inputted I and Q signals, whether or not to insert a pulse; a rotation detector that detects, based on the inputted I and Q signals, a rotation direction of variations of the I and Q signals on an IQ plane with respect to the origin of the IQ plane; a pulse generator that generates, when the determination unit determines to insert a pulse, a pulse of which at least one of the direction and the magnitude is determined in accordance with at least the detected rotation direction; and an adder that inserts the pulse into the inputted I and Q signals and outputs resultant I and Q signals.

The determination unit may compare magnitudes of the I and Q signals with a predetermined threshold value, and determine based on a result of the comparison whether or not to insert the pulse.

The adder may be configured to have multiple delay devices and multiple adders therein that are alternately connected, and the determination unit may determine whether or not to continue pulse insertion, based on a signal outputted from at least one of the multiple adders.

Preferably, in a case where symbols that are obtained by oversampling the I and Q signals indicate a symbol transition from a first symbol to a second symbol, and one of the first and second symbols is, during a predetermined time period, a symbol closest to the origin on the IQ plane and the other one of the first and second symbols is, during the predetermined time period, a symbol second closest to the origin on the IQ plane, the determination unit determines, based on a distance, of the symbol closest to the origin, from the origin and based on a rotation direction, with respect to the origin, of a variation of the symbol, whether or not to perform pulse insertion, and in the case of performing the pulse insertion, determines the direction and the magnitude of a pulse to be inserted.

A second aspect of the present invention is directed to a transmission circuit that includes the above-described nonlinear filter and to a radio communication device.

A third aspect of the present invention is directed to an integrated circuit that integrates the above-described functions of the nonlinear filter and to a method for a processor to perform the above-described processing of the nonlinear filter.

The present invention makes it possible to provide a nonlinear filter that is, in a transmission circuit, capable of uniformly improving distortion reduction characteristics over a range of desired frequencies higher or lower than a carrier wave band.

The present invention is applicable to transmission circuits and useful for communication devices such as mobile phones and wireless LAN devices.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the drawings.

First Embodiment

Figure 1:
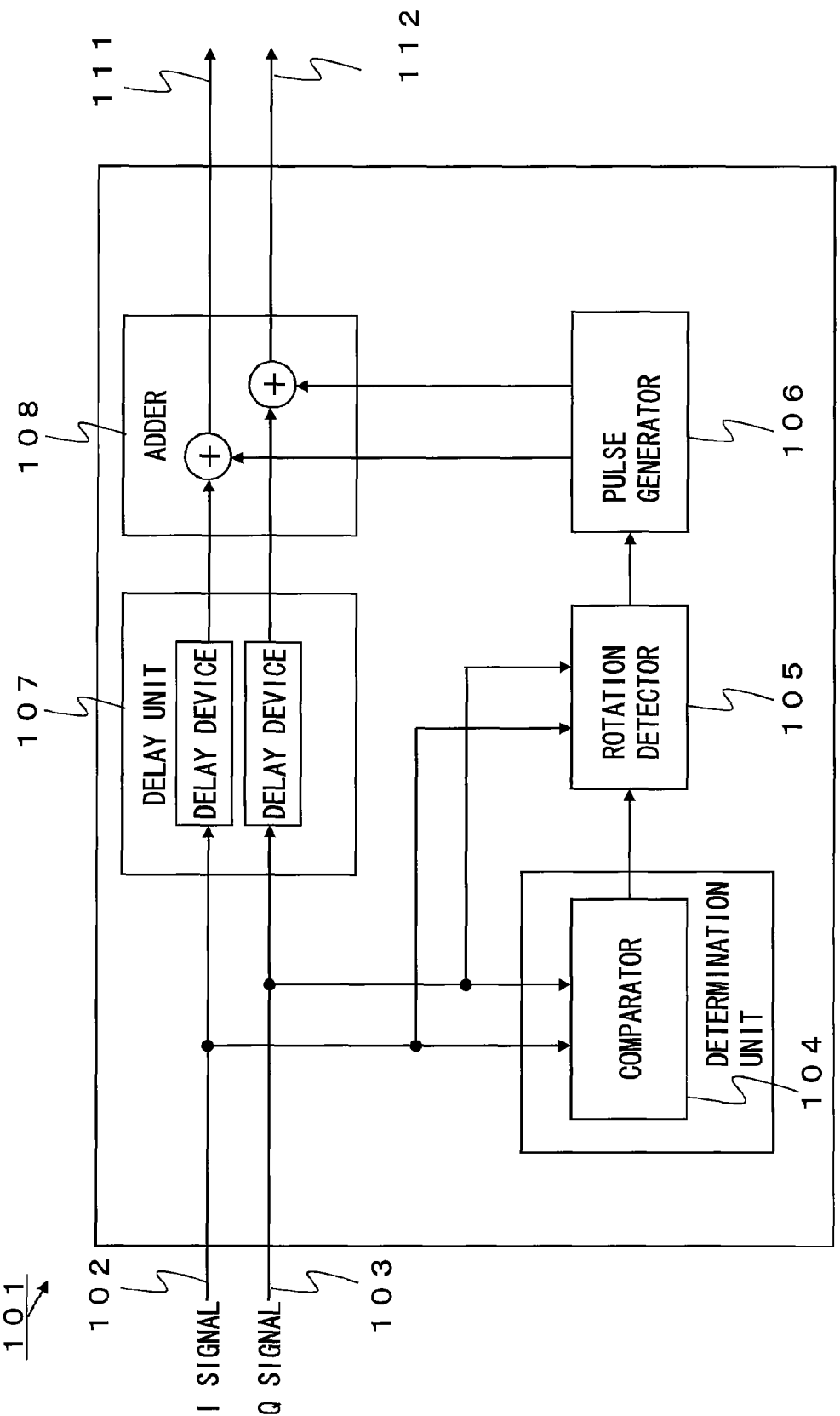
FIG. 1 shows a configuration of a nonlinear filter according to a first embodiment of the present embodiment.
Figure 2:
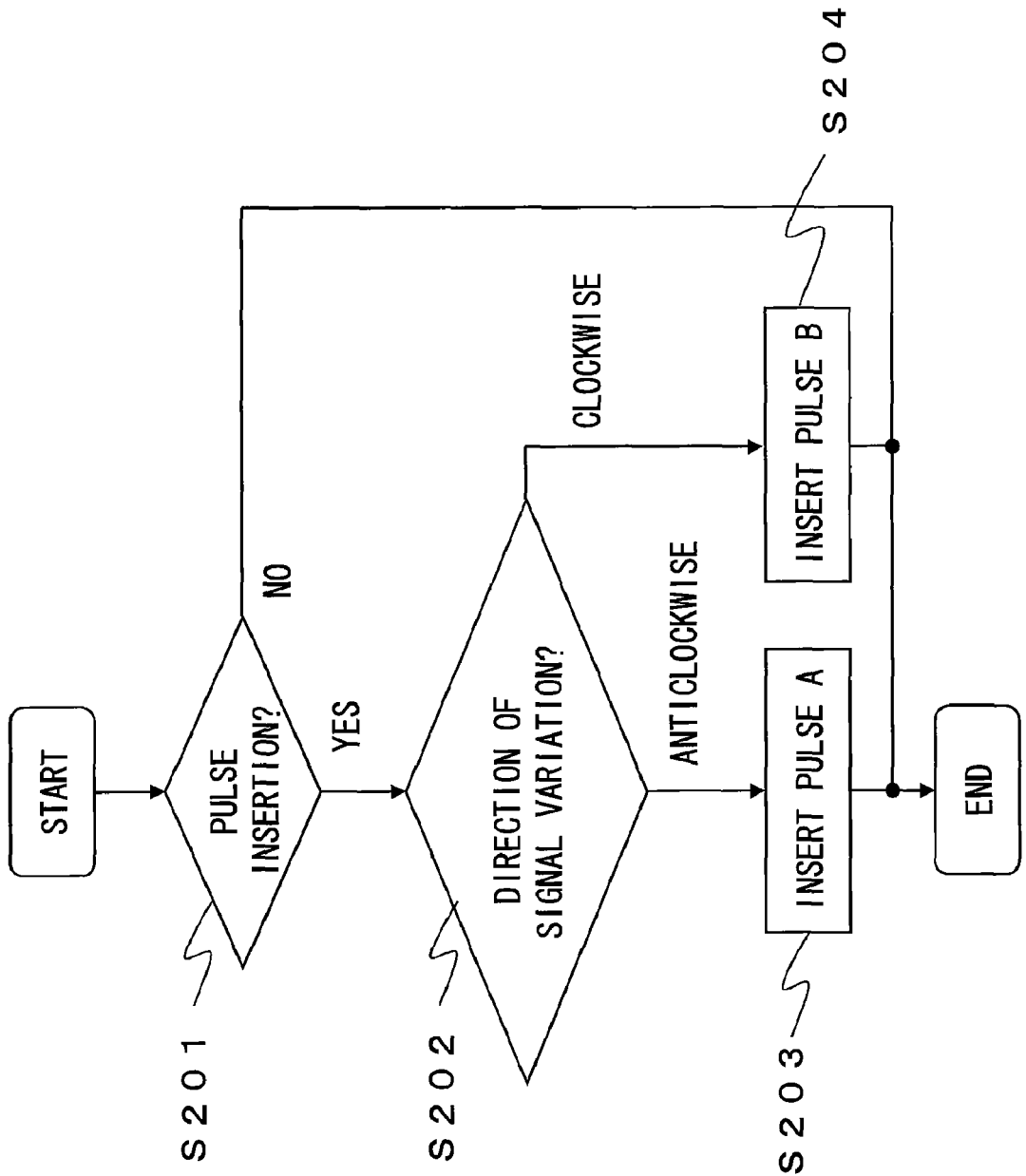
FIG. 2 shows a flow of processing performed by the nonlinear filter according to the first embodiment of the present invention.

A first embodiment of the present invention is described below with reference to FIG. 1 to FIG. 5. FIG. 1 is a block diagram showing a configuration of a nonlinear filter 101 according to the present embodiment. The nonlinear filter 101 includes input lines 102 and 103, a comparator 104, a rotation detector 105, a pulse generator 106, a delay unit 107, an adder 108, and output lines 111 and 112. Although not shown, the nonlinear filter 101 may include a power line for power supply, a controller that performs control for synchronization or the like, and control wiring. FIG. 2 shows a flow of processing performed by the nonlinear filter 101. Hereinafter, operations of the nonlinear filter 101 will be described with reference to FIG. 1 and FIG. 2.

I and Q signals are inputted into the comparator 104, the rotation detector 105, and the delay unit 107 via the input lines 102 and 103, respectively. The comparator 104 determines based on the I and Q signals whether or not to perform pulse insertion (step S201). When the comparator 104 determines not to perform pulse insertion, the operation of the comparator 104 terminates. In this case, the I and Q signals, into which a pulse has not been inserted, are outputted from the output lines 111 and 112, respectively, as outputs from the nonlinear filter 101. Note that since the comparator 104 determines whether or not to perform pulse insertion, the comparator 104 may be referred to as a determination unit.

When the comparator 104 determines to perform pulse insertion, the comparator 104 notifies the rotation detector 105 of the determination result. The rotation detector 105 having received the notification determines whether variations of the I and Q signals are in an anticlockwise direction or in a clockwise direction (step S202). The pulse generator 106 is notified of the determination result.

When the determination result indicates that the variations of the I and Q signals are in an anticlockwise direction, the pulse generator 106 generates a pulse A and outputs an I component and a Q component thereof separately (step S203). On the other hand, when the determination result indicates that the variations of the I and Q signals are in a clockwise direction, the pulse generator 106 generates a pulse B different from the pulse A, separates the pulse B into an I component and a Q component, and outputs the I and Q components (step S204). The outputted pulse A or B is inputted into the adder 108. Meanwhile, the inputted I and Q signals are inputted into the adder 108 via the delay unit 107. Here, the delay unit 107 delays each of the I and Q signals by a time that is required for the processing at the comparator 104, the rotation detector 105, and the pulse generator 106, thereby adjusting the timing of the pulse insertion. The adder 108 performs the pulse insertion by adding the pulse to the I and Q signals, and outputs the resultant I and Q signals via the output lines 111 and 112, respectively, as outputs from the nonlinear filter 101. Note that the pulse generator 106 processes an impulse signal with a low-pass filter such as a root-raised-cosine filter or a Gaussian filter, thereby generating a band-limited pulse.

Hereinafter, a determination process performed by the comparator 104 and a determination process performed by the rotation detector 105 will be described. The comparator 104 calculates the magnitude of the I and Q signals inputted into the comparator 104. Here, the magnitude refers to distances of coordinates on the IQ plane from the origin of the IQ plane, the coordinates representing the I and Q signals. That is, when the coordinates of a symbol S1 are $(i_1, q_1)$, the magnitude is a square root of $i_1^2+q_2^2$. Next, the comparator 104 compares the calculated magnitude with a predetermined threshold value. When the calculated magnitude is less than the predetermined threshold value, the comparator 104 determines to perform pulse insertion.

Figure 3:
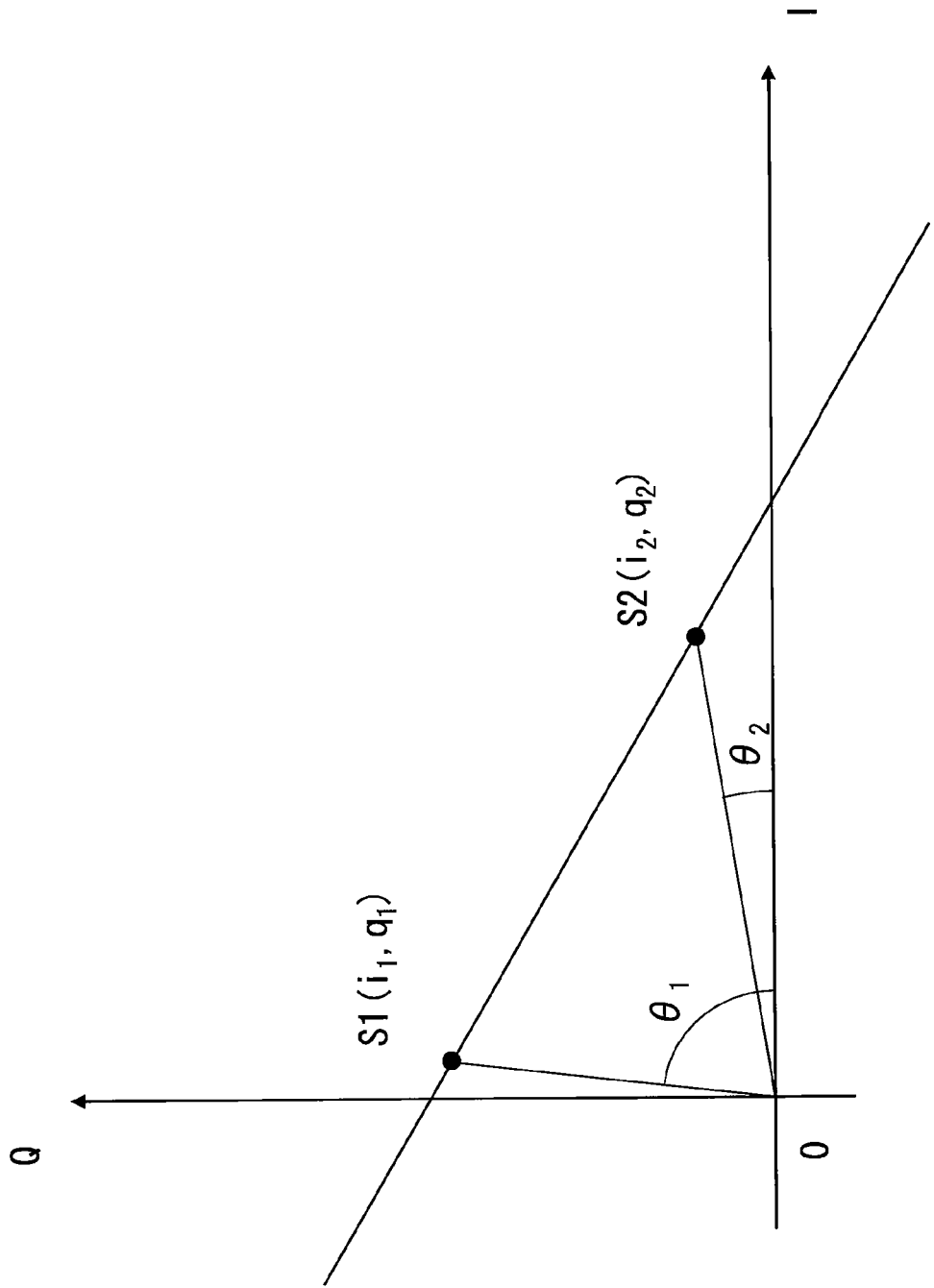
FIG. 3 shows processing performed by the nonlinear filter according to the first embodiment of the present invention.

The determination process performed by the rotation detector 105 is described below with reference to FIG. 3. FIG. 3 shows variations of the inputted I and Q signals on the IQ plane. Whether or not the I and Q signals are in an anticlockwise direction is determined based on a rotational direction of the variations of the I and Q signals on the IQ plane with respect to the origin of the IQ plane. In FIG. 3, the anticlockwise direction with respect to the origin is the phase lead direction, and the clockwise direction with respect to the origin is the phase lag direction. Here, assuming that the I and Q signals have varied from the symbol S1 $(i_1, q_1)$ to the symbol S2 $(i_2, q_2)$, if angles formed by vectors $(i_1, q_1)$ and $(i_2, q_2)$ with respect to the I axis positive direction are $\theta_1$ and $\theta_2$, respectively, then (equation 1) presented below is established in general.

$$\sin(\theta_1 - \theta_2) = \frac{q_1 \cdot \Delta i - i_1 \cdot \Delta q}{\sqrt{i_1^2 + q_1^2} \sqrt{i_2^2 + q_2^2}} \quad \text{[equation 1]}$$

wherein $\Delta i = i_2 - i_1$ $\Delta q = q_2 - q_1$

Accordingly, if $q_1 \cdot \Delta i - i_1 \cdot \Delta q$ is positive, the I and Q signals can be determined to have varied clockwise, and if $q_1 \cdot \Delta i - i_1 \cdot \Delta q$ is negative, the I and Q signals can be determined to have varied anticlockwise.

Figure 4:
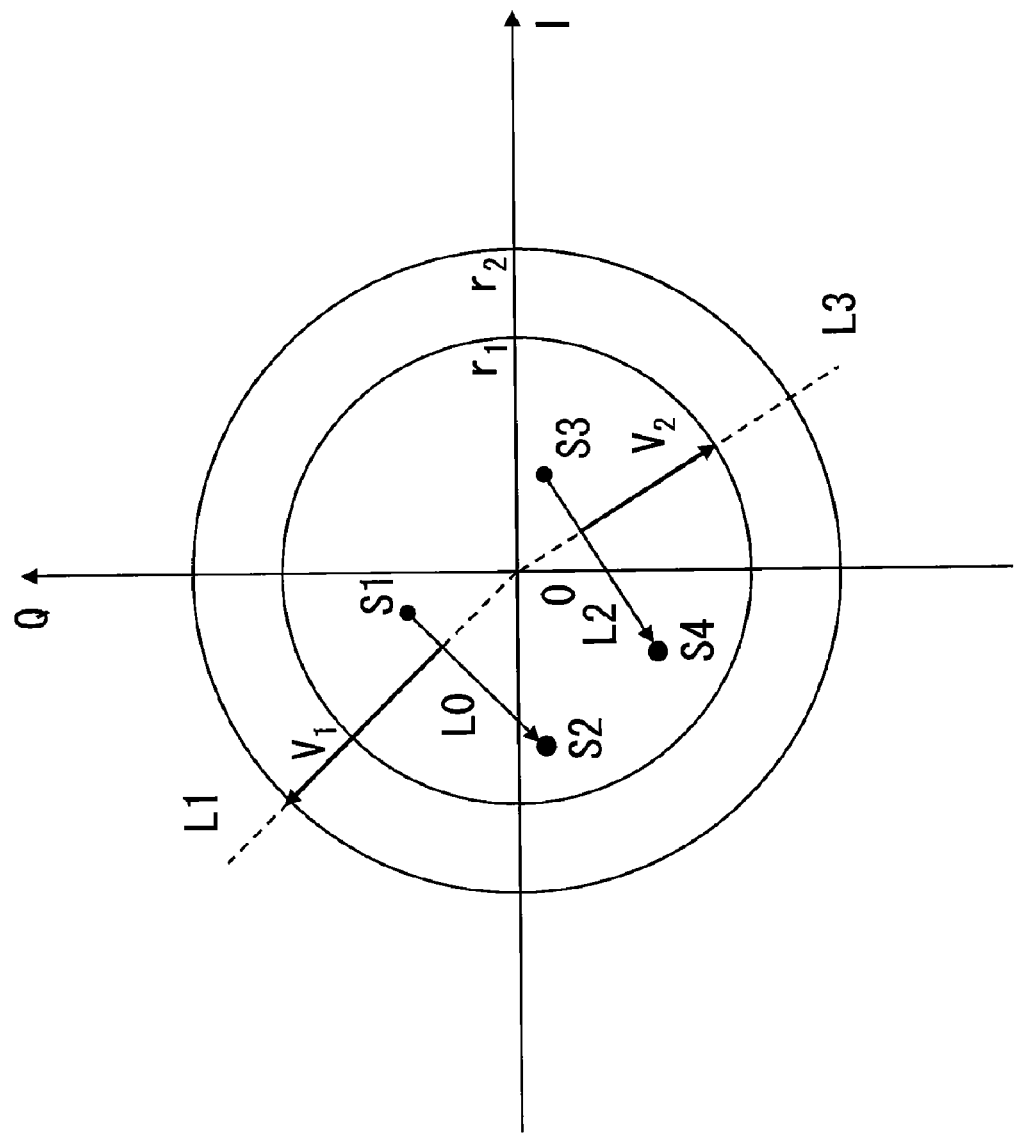
FIG. 4 shows processing performed by the nonlinear filter according to the first embodiment of the present invention.

Described next with reference to FIG. 4 are examples of a criterion for determining whether or not to perform pulse insertion and the manner of determining the magnitude of a pulse to be inserted. In general, the I and Q signals are oversampled at intervals shorter than a symbol time, that is, shorter than intervals of a sequence of symbols that represent transmission data, and are subjected to filter processing using a root-raised-cosine filter or the like. When, among the oversampled symbols, a symbol closest to the origin during a predetermined time period is a symbol S1, the comparator 104 determines to perform pulse insertion if the symbol S1 is present within a circle that centers around the origin of the IQ plane and that has a radius of a threshold value $r_1$, and determines not to perform pulse insertion if the symbol S1 is not present within the circle. Here, the aforementioned symbol time may be used as the predetermined time period, for example.

The magnitude and the direction of the pulse to be inserted are described below. Assume a case where among the oversampled symbols, a symbol closest to the origin during a predetermined time period is a symbol S1 and a symbol second closest to the origin during the predetermined time period is a symbol S2. Alternatively, the second closest symbol to the origin may be the symbol S1 and the closest symbol may be the symbol S2. Here, assume that the I and Q signals have shifted from the symbol S1 to the symbol S2 in the anticlockwise direction. In this case, consider a straight line L0 that passes through the symbols S1 and S2 and a straight line L1 that passes through the origin and that is orthogonal to the straight line L0. The pulse generator 106 inserts a vector $V_1$ as a pulse A. The starting point of the vector $V_1$ is an intersection point of the straight lines L0 and L1 and the end point of the vector $V_1$ is one of intersection points of the straight line L1 and a circle that centers around the origin and that has a radius $r_2$ ($r_2 > r_1$), which one of the intersection points is closer to the starting point than the other intersection point. Further, assume a case where a symbol closest to the origin during the predetermined time period is a symbol S3 and a symbol second closest to the origin during the predetermined time period is a symbol S4. Alternatively, the second closest symbol to the origin may be the symbol S3 and the closest symbol may be the symbol S4. Here, assume that the I and Q signals have shifted from the symbol S3 to the symbol S4 in the clockwise direction. In this case, consider a straight line L2 that passes through the symbols S3 and S4 and a straight line L3 that passes through the origin and that is orthogonal to the straight line L2. The pulse generator 106 inserts a vector $V_2$ as a pulse B. The starting point of the vector $V_2$ is an intersection point of the straight lines L2 and L3 and the end point of the vector $V_2$ is one of intersection points of the straight line L3 and the circle having the radius $r_1$, which one of the intersection points is closer to the starting point than the other intersection point. For example, these vectors $V_1$ and $V_2$ are calculated by the rotation detector 105 based on the I and Q signals, and the pulse generator 106 is notified of these vectors $V_1$ and $V_2$.

Figure 5:
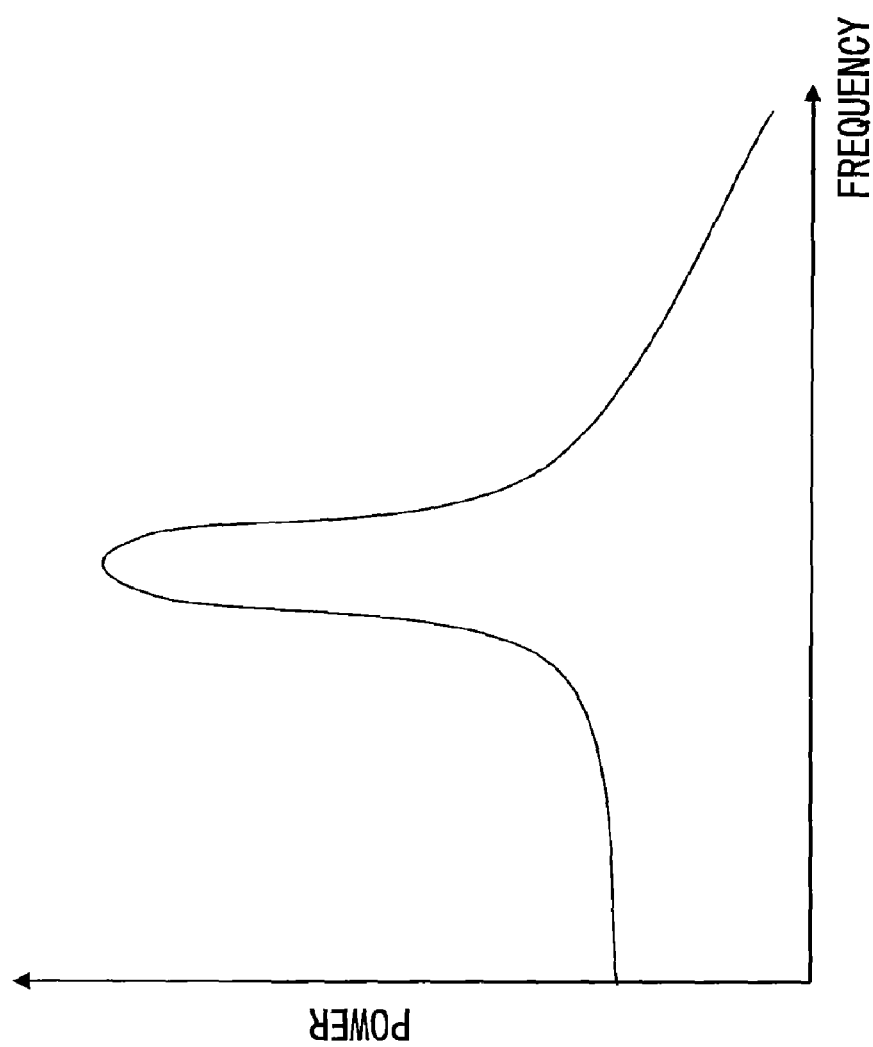
FIG. 5 shows the spectrum of an output from a transmission circuit that includes the nonlinear filter according to the first embodiment of the present invention.

The nonlinear filter 101 as described above can be incorporated into a transmission circuit. Such a transmission circuit using the nonlinear filter 101 will be described below. FIG. 5 shows an output from such a transmission circuit. In FIG. 5, the horizontal axis represents frequency and the vertical axis represents power. As described above, the inserted pulse is larger when the symbol transition is in the anticlockwise direction, that is, in the direction causing frequency increase, than when the symbol transition is in the clockwise direction, that is, in the direction causing frequency decrease. As a result, the spectrum of the output is such that the power is less on the higher frequency side with respect to a carrier wave band than on the lower frequency side, in a band near the carrier wave band as well as in a band distant from the carrier wave band.

Conversely, if the inserted pulse is larger when the symbol transition is in the clockwise direction, that is, in the direction causing frequency decrease, than when the symbol transition is in the anticlockwise direction, that is, in the direction causing frequency increase, then a spectrum can be obtained in which the power is less on the lower frequency side with respect to the carrier wave band than on the higher frequency side.

As described above, by using the nonlinear filter 101 in a transmission circuit, the spectrum characteristics of the transmission circuit can be improved over a range of desired frequencies higher or lower than the carrier wave band, without causing significant deterioration of EVM (Error Vector Magnitude; modulation accuracy). Note that it is not necessary to perform the pulse insertion when a phase variation does not occur due to a symbol transition. In such a case, however, the same pulse as that inserted in the case of anticlockwise direction may be inserted, or the same pulse as that inserted in the case of clockwise direction may be inserted.

Second Embodiment

Figure 6:
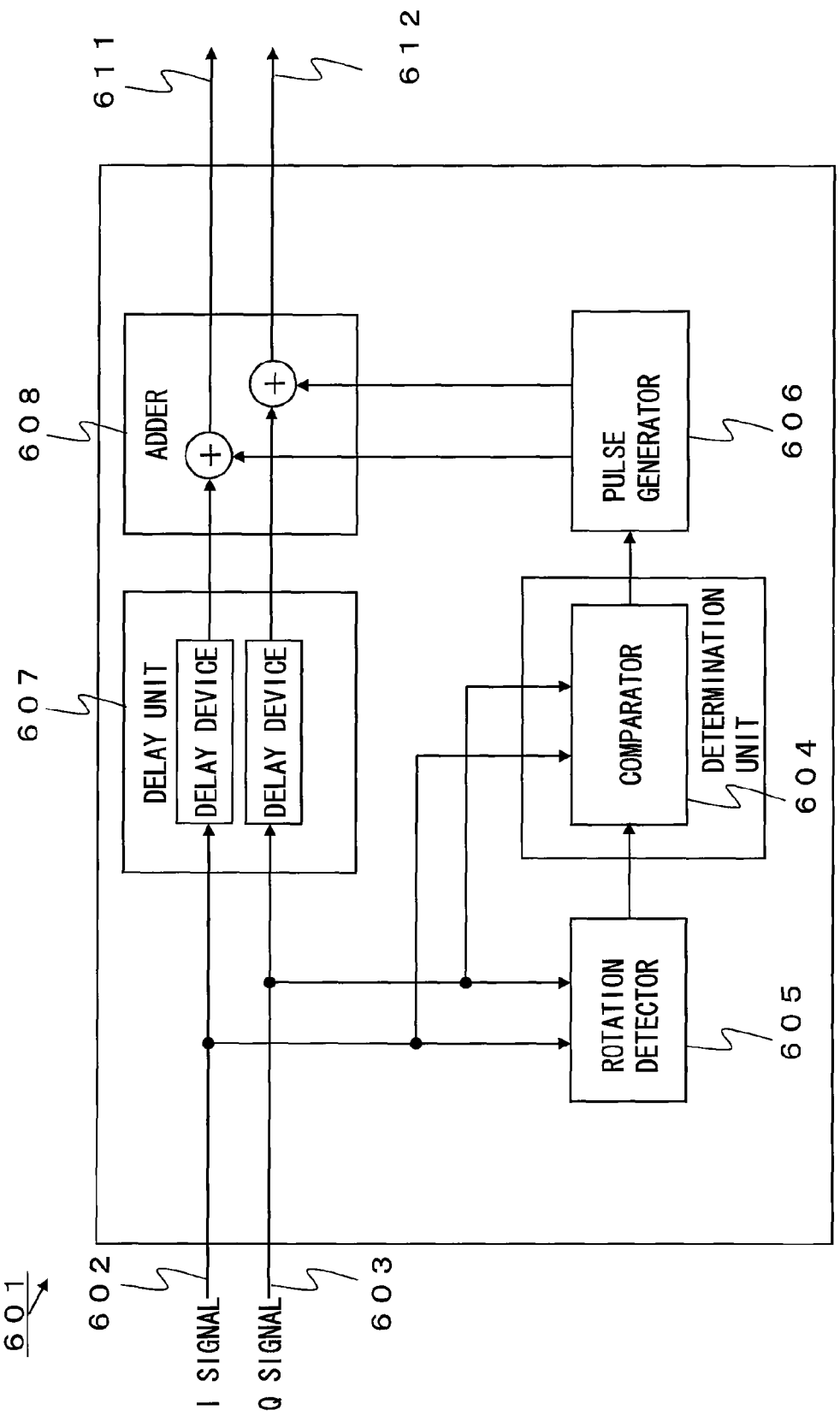
FIG. 6 shows a configuration of a nonlinear filter according to a second embodiment of the present invention.
Figure 7:
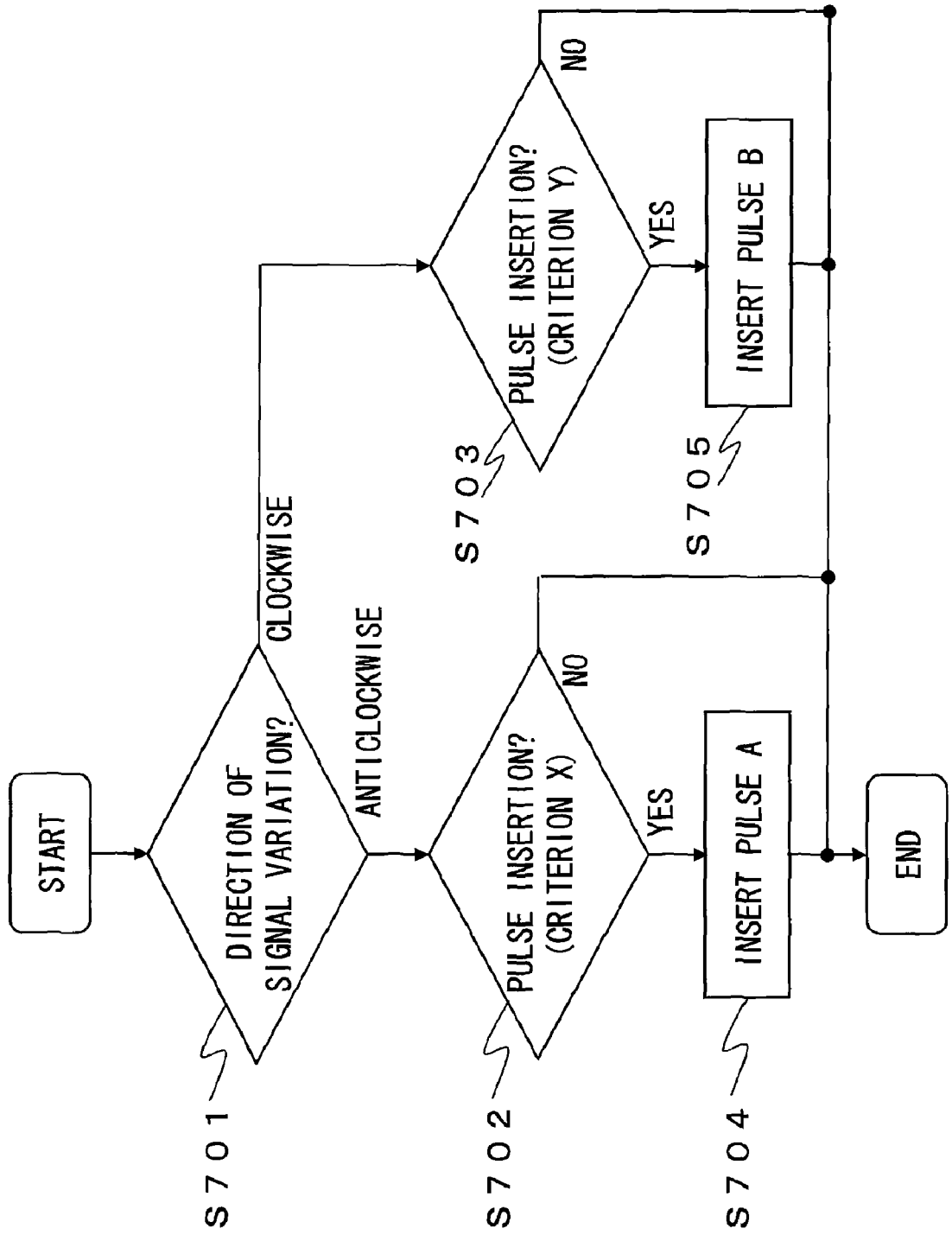
FIG. 7 shows a flow of processing performed by the nonlinear filter according to the second embodiment of the present invention.

A second embodiment of the present invention is described below with reference to FIG. 6 to FIG. 13. FIG. 6 is a block diagram showing a configuration of a nonlinear filter 601 according to the present embodiment. Similar to the nonlinear filter 101 according to the first embodiment, the nonlinear filter 601 includes input lines 602 and 603, a comparator 604, a rotation detector 605, a pulse generator 606, a delay unit 607, an adder 608, and output lines 611 and 612. The nonlinear filter 601 is different from the nonlinear filter 101 in that the criterion for the comparator 604 to determine whether or not to perform pulse insertion is changeable in accordance with the direction of variations of the I and Q signals. FIG. 7 shows a flow of processing by the nonlinear filter 601. Hereinafter, operations of the nonlinear filter 601 will be described with reference to FIG. 6 and FIG. 7.

I and Q signals are inputted into the rotation detector 605, the comparator 604, and the delay unit 607 via the input lines 602 and 603, respectively. The rotation detector 605 determines whether variations of the I and Q signals on the IQ plane are in the anticlockwise direction or in the clockwise direction (step S701) with respect to the origin. The comparator 604 is notified of the determination result.

The comparator 604 determines, based on the above determination result and the I and Q signals, whether or not to perform pulse insertion. In the determination, the comparator 604 uses either a determination criterion X or a determination criterion Y that are different from each other, in accordance with the above determination result (steps S702, S703). Here, when the comparator 604 determines not to perform pulse insertion, the operation of the comparator 604 terminates. In this case, the I and Q signals, into which a pulse has not been inserted, are outputted from the output lines 611 and 612, respectively, as outputs from the nonlinear filter 601.

When the determination result provided by the rotation detector indicates that the variations of the I and Q signals are in the anticlockwise direction, the pulse generator 606 outputs a pulse A (step S704). On the other hand, when the determination result indicates that the variations of the I and Q signals are in the clockwise direction, the pulse generator 606 outputs a pulse B different from the pulse A (step S705). The outputted pulse A or B is inputted into the adder 608 and added to the I and Q signals that have been delayed by the delay unit 607, and the resultant I and Q signals are outputted from the output lines 611 and 612, respectively, as outputs from the nonlinear filter 601.

Figure 8:
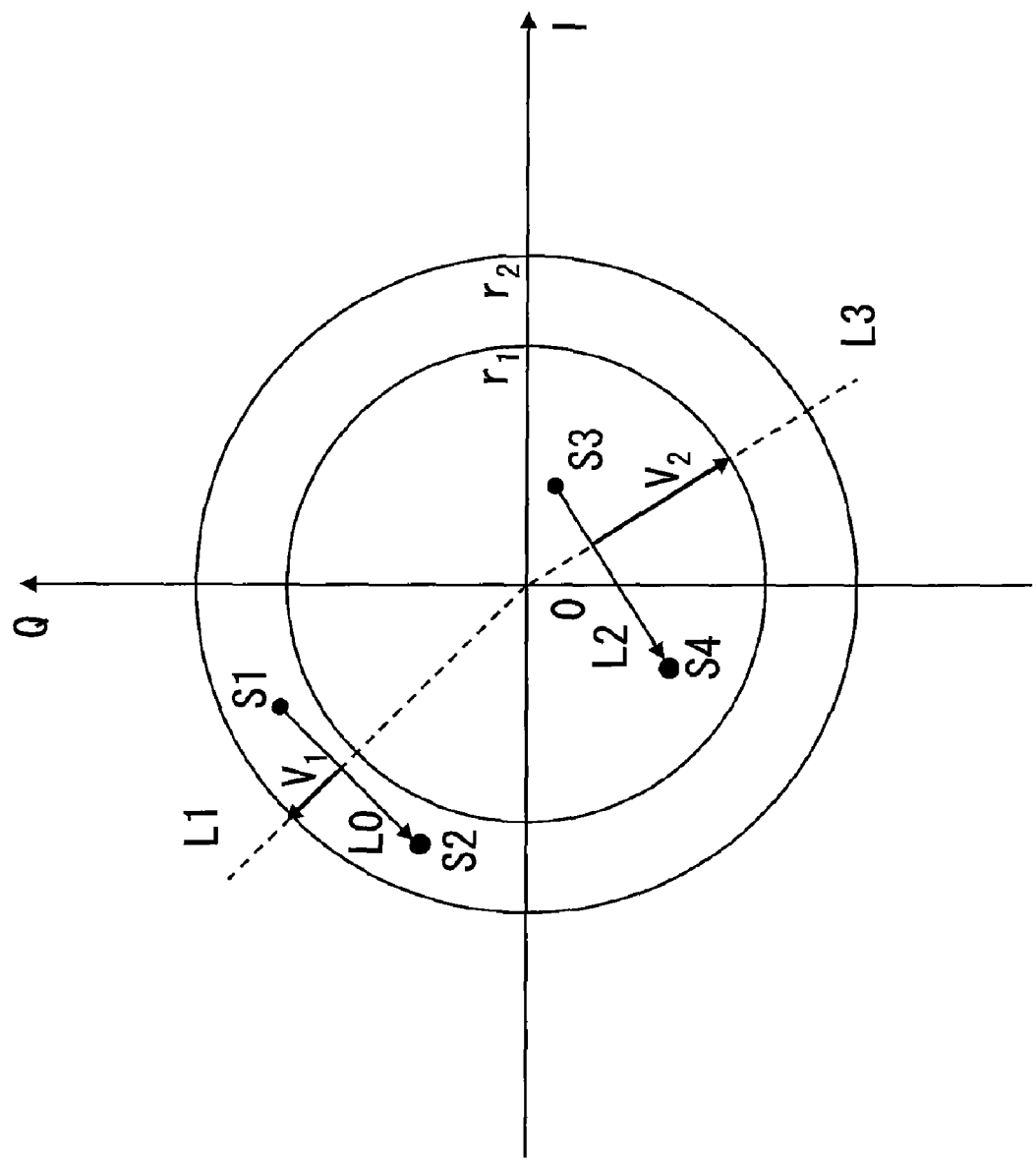
FIG. 8 shows processing performed by the nonlinear filter according to the second embodiment of the present invention.

Described next with reference to FIG. 8 are the criteria for determining whether or not to perform the pulse insertion and the manner of determining the magnitude of the pulse to be inserted. Assume a case where among the oversampled symbols, a symbol closest to the origin during a predetermined time period is a symbol S1 and a symbol second closest to the origin during the predetermined time period is a symbol S2. Alternatively, the second closest symbol to the origin may be the symbol S1 and the closest symbol may be the symbol S2. As with the first embodiment, the aforementioned symbol time may be used as the predetermined time period. Here, assume that the symbol representing the I and Q signals has transitioned from the symbol S1 to the symbol S2 in the anticlockwise direction. In this case, consider a straight line L0 that passes through the symbols S1 and S2 and a straight line L1 that passes through the origin and that is orthogonal to the straight line L0. The comparator 604 determines to perform pulse insertion if the closest symbol to the origin (i.e., the symbol S1 or S2) is present within the circle that centers around the origin of the IQ plane and that has a radius of the threshold value $r_2$, and determines not to perform pulse insertion if the symbol S1 is not present within the circle. Such a determination criterion is the aforementioned criterion X. When the comparator 604 determines to perform pulse insertion, the pulse generator 606 inserts a vector $V_1$ as a pulse A. The starting point of the vector $V_1$ is an intersection point of the straight lines L0 and L1 and the end point of the vector $V_1$ is one of intersection points of the straight line L0 and the circle that centers around the origin and that has the radius $r_2$, which one of the intersection points is closer to the starting point than the other intersection point.

Further, assume a case where, among the oversampled symbols, a symbol closest to the origin during the predetermined time period is a symbol S3 and a symbol second closest to the origin during the predetermined time period is a symbol S4. Alternatively, the second closest symbol to the origin may be the symbol S3 and the closest symbol may be the symbol S4. Here, assume that the symbol representing the I and Q signals has transitioned from the symbol S3 to the symbol S4 in the clockwise direction. In this case, consider a straight line L2 that passes through the symbols S3 and S4 and a straight line L3 that passes through the origin and that is orthogonal to the straight line L2. The comparator 604 determines to perform pulse insertion if the closest symbol to the origin (i.e., the symbol S3 or S4) is present within the circle that centers around the origin of the IQ plane and that has a radius of the threshold value $r_1$ ($r_1 < r_2$), and determines not to perform pulse insertion if the closest symbol to the origin is not present within the circle. Such a determination criterion is the aforementioned criterion Y. When the comparator 604 determines to perform pulse insertion, the pulse generator 606 inserts a vector $V_2$ as a pulse B. The starting point of the vector $V_2$ is an intersection point of the straight lines L2 and L3 and the end point of the vector $V_2$ is one of intersection points of the straight line L3 and the circle that centers around the origin and that has the radius $r_1$, which one of the intersection points is closer to the starting point than the other intersection point. For example, these vectors $V_1$ and $V_2$ are calculated by the comparator 604 based on the I and Q signals, and the pulse generator 606 is notified of these vectors $V_1$ and $V_2$.

Figure 9:
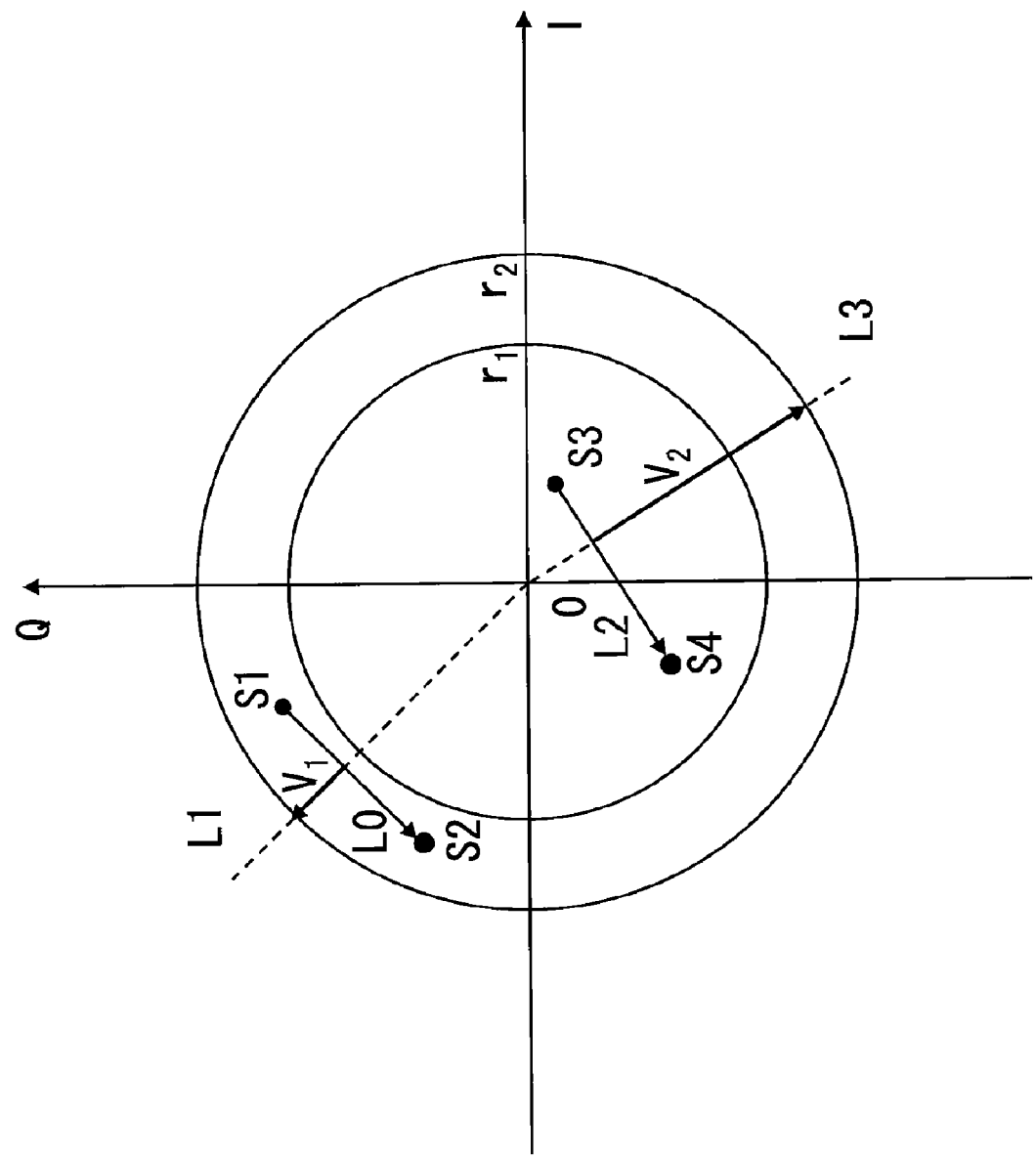
FIG. 9 shows processing performed by the nonlinear filter according to the second embodiment of the present invention.
Figure 10:
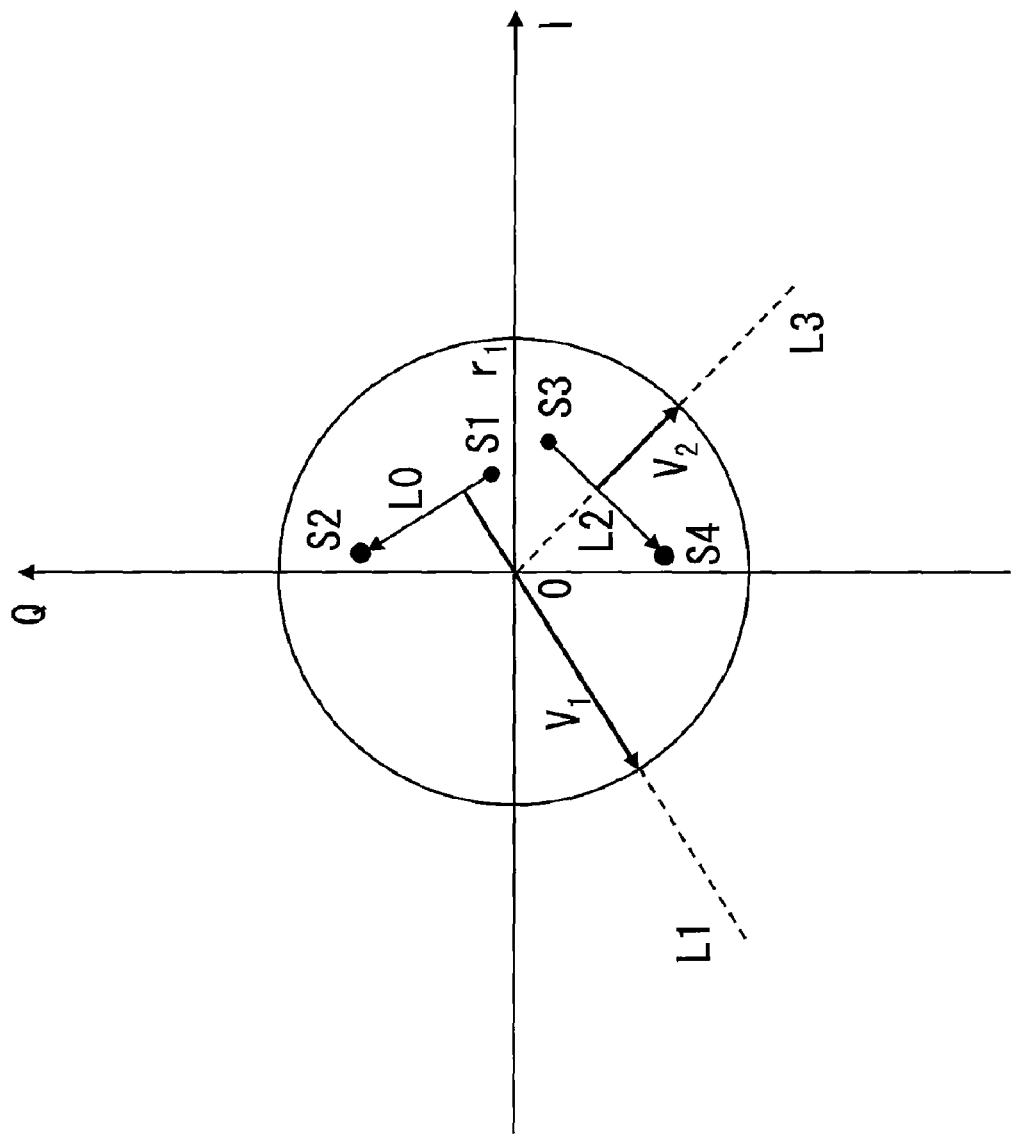
FIG. 10 shows processing performed by the nonlinear filter according to the second embodiment of the present invention.

Alternatively, as shown in FIG. 9, the end point of the pulse to be inserted may be fixed while the threshold value for determining whether or not to perform pulse insertion is different depending on the variations of the I and Q signals. To be specific, the threshold value may be set to $r_2$ in the case of the anticlockwise direction, and the threshold value may be set to $r_1$ in the case of the clockwise direction. In either case, the end point of the pulse to be inserted may be located on the circle having the radius $r_2$. In FIG. 9, the end point of the vector $V_2$ is different from that in FIG. 8.

In these cases, when the variations of the I and Q signals are in the anticlockwise direction, that is, in the direction causing frequency increase, requirements to be satisfied for determining to perform pulse insertion are less strict than when the variations of the I and Q signals are in the clockwise direction. Accordingly, the high frequency components of the I and Q signals are reduced at a greater degree than the low frequency components thereof.

Figure 11:
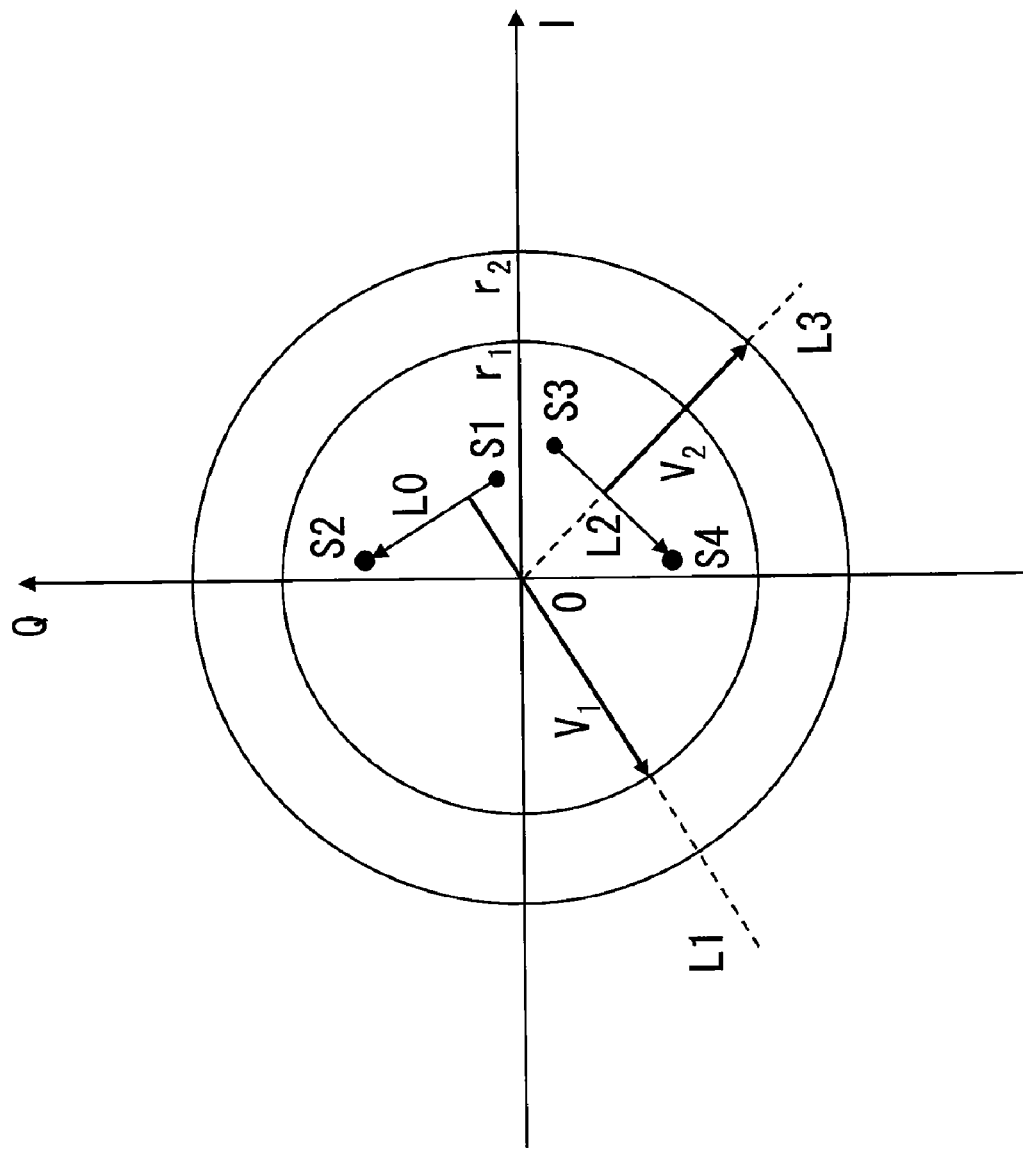
FIG. 11 shows processing performed by the nonlinear filter according to the second embodiment of the present invention.

Alternatively, the direction of the pulse to be inserted may be different in accordance with the direction of variations of the I and Q signals while the threshold value for determining whether or not to perform pulse insertion is fixed. An example of such a case is described below with reference to FIG. 10. In this case, when the variations of the I and Q signals are in the clockwise direction as indicated by symbols S3 and S4, a vector used as the pulse B is a vector $V_2$ that is similar to the vector $V_2$ described above. The starting point of the vector $V_2$ is an intersection point of a straight line L2 that passes through the closest symbol to the origin and the second closest symbol to the origin, and a straight line L3 that passes through the origin and that is orthogonal to the straight line L2. The end point of the vector $V_2$ is one of intersection points of the straight line L3 and the circle having the radius $r_1$, which one of the intersection points is closer to the starting point than the other intersection point. However, when the variations of the I and Q signals are in the anticlockwise direction as indicated by symbols S1 and S2, a vector to be used as the pulse A is a vector $V_1$, the starting point of which is an intersection point of a straight line L0 and a straight line L1, and the end point of which is one of intersection points of the straight line L1 and the circle having the radius $r_1$, which one of the intersection points is more distant from the starting point than the other intersection point. FIG. 11 shows a variation of this case. The variation from the above is that when the variations of the I and Q signals are in the clockwise direction, the end point of the vector $V_2$ is set to the intersection point of the straight line L2 and the circle having the radius $r_2$.

In the above cases, even when the variations of the I and Q signals are determined to be in the anticlockwise direction, the inserted pulse causes the transition path of these signals to shift beyond the origin. Accordingly, the direction of the variations of the I and Q signals changes into the clockwise direction. As a result, the high frequency components of the I and Q signals are further reduced. In the examples shown in FIG. 10 and FIG. 11, the threshold value for determining whether or not to perform pulse insertion may be different depending on the direction of variations of the I and Q signals. Note that the processing that is performed with a fixed threshold value can be realized also by using the nonlinear filter 101 according to the first embodiment.

By using the nonlinear filter 601 as described above, the spectrum as shown in FIG. 6 can be obtained in which the power is less on the higher frequency side with respect to the carrier wave band than on the lower frequency side, in a band near the carrier wave band as well as in a band distant from the carrier wave band. If it is desired that the power is less on the lower frequency side with respect to the carrier wave band than on the higher frequency side, it is only necessary in the above descriptions to replace the anticlockwise direction with the clockwise direction and vice versa.

Third Embodiment

A nonlinear filter 1201 according to a third embodiment of the present invention is based on the nonlinear filter 101 according to the first embodiment. The nonlinear filter 1201 uses a below-described criterion for determining whether or not to perform pulse insertion and a below-described manner of determining the magnitude of a pulse to be inserted. The nonlinear filter 1201 has the same block configuration as that of the nonlinear filter 101, and therefore is not shown. The components of the nonlinear filter 1201 are denoted by the same reference numerals as those used for the nonlinear filter 101. The disclosure of U.S. patent application Ser. No. 12/414,016 is incorporated herein by reference.

Figure 12:
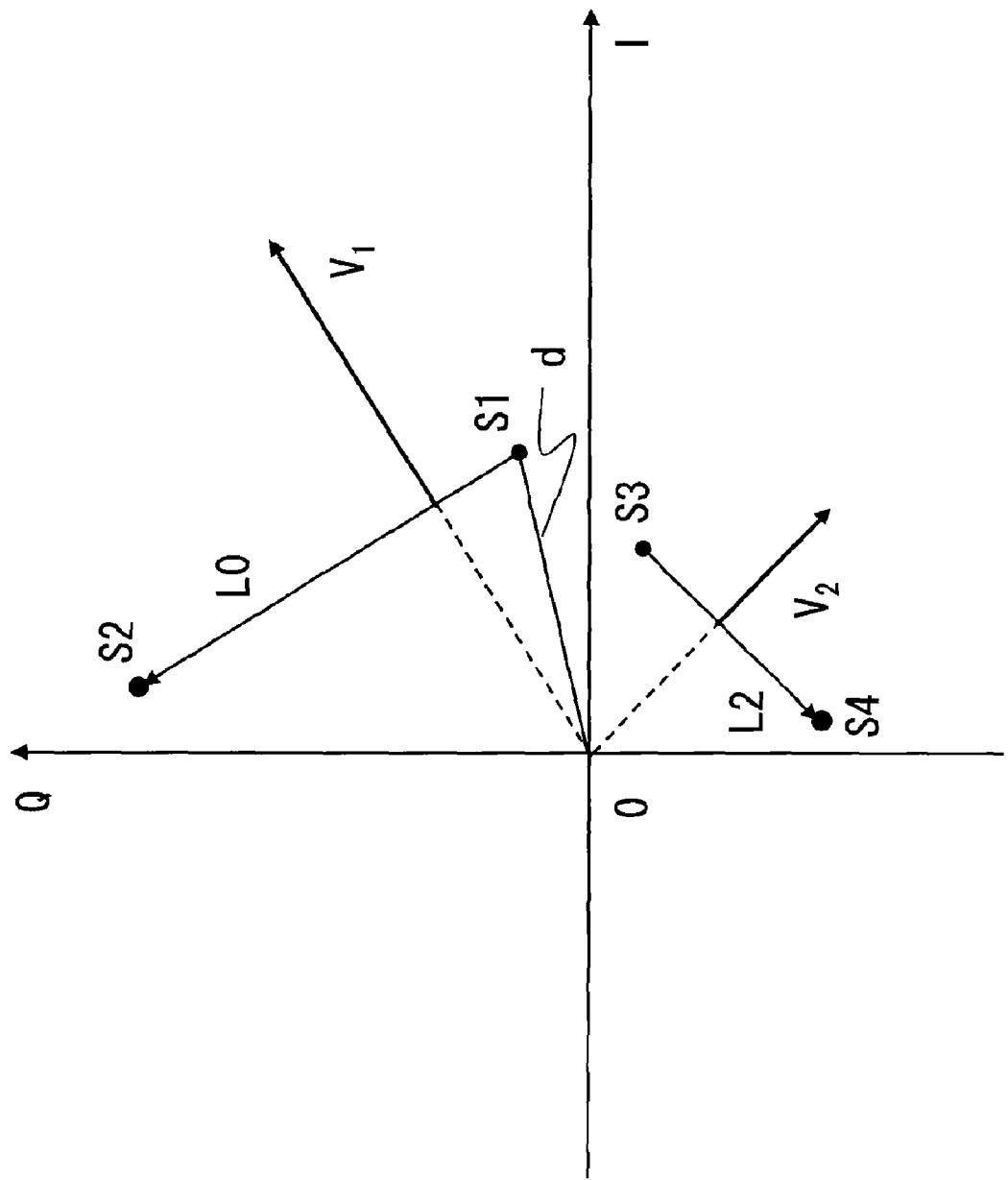
FIG. 12 shows processing performed by the nonlinear filter according to the second embodiment of the present invention.

The criterion for determining whether or not to perform pulse insertion and the manner of determining the magnitude of a pulse to be inserted, according to the present embodiment, are described below with reference to FIG. 12. Assume a case where among the oversampled symbols, a symbol closest to the origin during a predetermined time period is a symbol S1 and a symbol second closest to the origin during the predetermined time period is a symbol S2. Alternatively, the second closest symbol to the origin may be the symbol S1 and the closest symbol may be the symbol S2. Here, as with the first and second embodiments, the symbol time may be used as the predetermined time period. Here, assume that the symbol representing the I and Q signals has transitioned from the symbol S1 $(i_1, q_1)$ to the symbol S2 $(i_2, q_2)$. FIG. 12 shows a case where the transition from the symbol S1 to the symbol S2 is in the anticlockwise direction. In this case, the comparator 104 calculates d by using (equation 2).

$$d = \frac{\sqrt{(i_2 - i_1)^2 + (q_2 - q_1)^2}}{\sqrt{i_1^2 + q_1^2}} \quad \text{(equation 2)}$$

The numerator of d represents a distance between the symbols S1 and S2, and the denominator thereof represents a distance of the symbol S1 from the origin. It can be considered that the greater the value d, the greater are the degree of the variations of the I and Q signals and the degree of the generation of the high frequency components of the I and Q signals.

The comparator 104 determines to perform pulse insertion when d is greater than a predetermined threshold value $d_0$. Based on sf calculated by using (equation 3) below and based on predetermined coefficients $\alpha_1$ and $\alpha_2$ ($\alpha_1 > \alpha_2 > 0$), the pulse generator 106 performs pulse insertion using a pulse having the magnitude of $\alpha_1 \cdot sf$ when the symbol transition is in the anticlockwise direction, and performs pulse insertion using a pulse having the magnitude of $\alpha_2 \cdot sf$ when the symbol transition is in the clockwise direction. Accordingly, in this case, the pulse insertion using the pulse having the magnitude of $\alpha_1 \cdot sf$ is performed. Further, assume a case where among the oversampled symbols, a symbol closest to the origin during the predetermined time period is a symbol S3 and a symbol second closest to the origin during the predetermined time period is a symbol S4. Alternatively, the second closest symbol to the origin may be the symbol S3 and the closest symbol may be the symbol S4. Here, assume that the symbol representing the I and Q signals has transitioned from the symbol S3 to the symbol S4 in the clockwise direction. Also in this case, whether or not to perform pulse insertion is determined in the same manner as described above. Here, the pulse insertion using the pulse having the magnitude of $\alpha_2 \cdot sf$ is performed.

$$sf = d - d_0 \quad \text{(equation 3)}$$

The direction of the pulse is one of two directions normal to a straight line L0 passing through the symbols S1 and S2, which direction is away from the origin. Alternatively, the direction of the pulse is one of two directions normal to a straight line L2 passing through the symbols S3 and S4, which direction is away from the origin. For example, the magnitude and the direction of the pulse are calculated by the comparator 104 based on the I and Q signals, and the pulse generator 106 is notified of the magnitude and the direction. As described above, when the symbol transition is in the anticlockwise direction, the magnitude of the pulse is determined by using a larger coefficient than when the symbol transition is in the clockwise direction. In this manner, the frequency components of the I and Q signals on the higher frequency side with respect to the carrier wave can be reduced at a greater degree than those on the lower frequency side.

Figure 13:
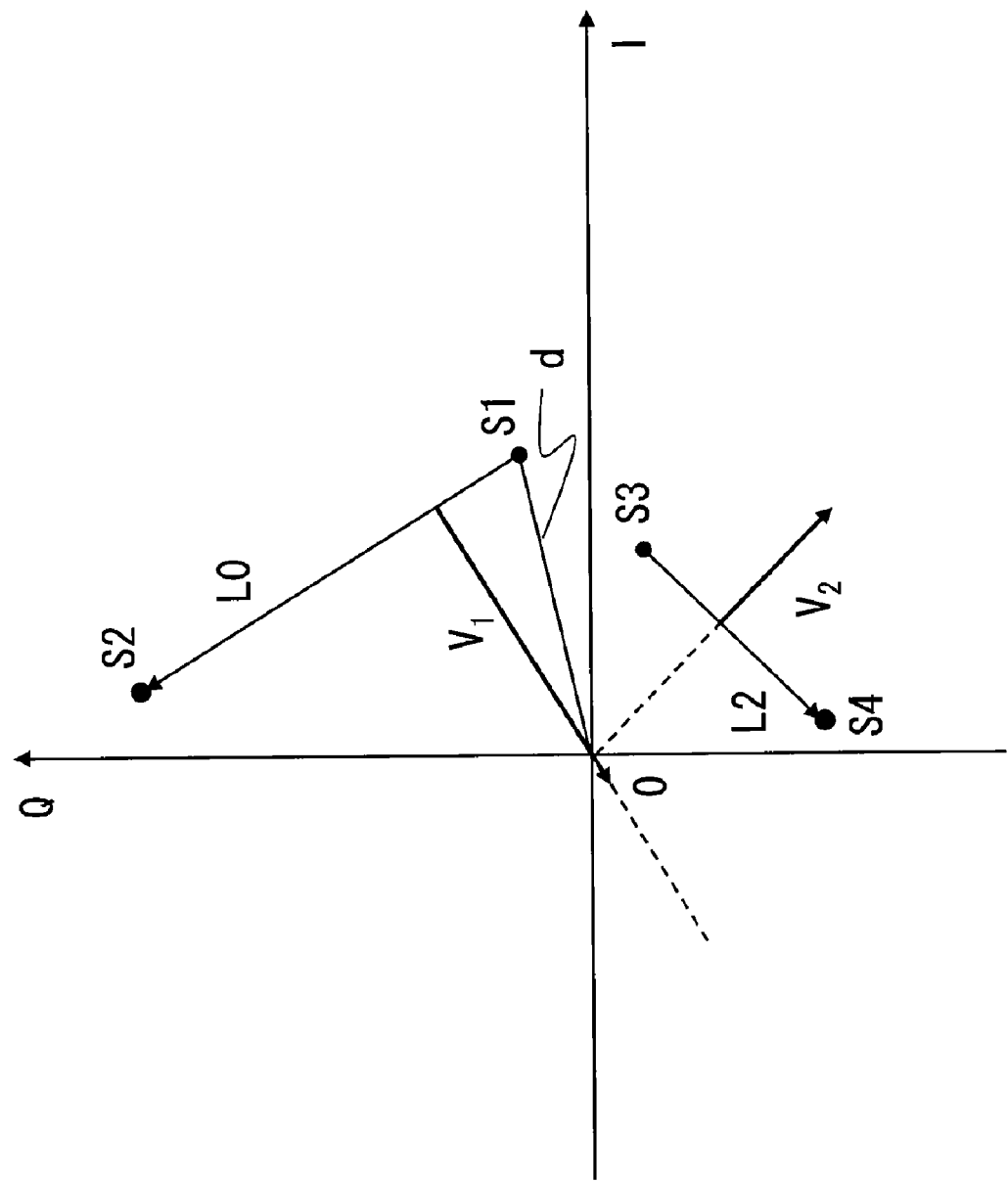
FIG. 13 shows processing performed by the nonlinear filter according to the second embodiment of the present invention.

When the variations of the I and Q signals are in the anticlockwise direction as shown in FIG. 13, the direction of the pulse may be opposite to the above. In FIG. 12, in either the case of anticlockwise direction from the symbol S1 to the symbol S2 or the case of clockwise from the symbol S3 to the symbol S4, the direction of the pulse is away from the origin. On the other hand, in FIG. 13, in the case of anticlockwise direction from the symbol S1 to the symbol S2, the direction of the pulse is toward the origin. Accordingly, in the case of transition from the symbol S1 to the symbol S2, the transition path of the I and Q signals shifts beyond the origin. As a result, the direction of the variations of the I and Q signals changes into the clockwise direction. Consequently, the high frequency components of the I and Q signals are further reduced.

Here, as an alternative, the nonlinear filter 601 of the second embodiment may be used in which the comparator 604 may use, instead of the aforementioned threshold value $d_0$, different threshold values $d_1$ and $d_2$ ($d_2 > d_1 > 0$) in accordance with the direction of variations of the I and Q signals. In this case, when the variations of the I and Q signals are in the anticlockwise direction, pulse insertion using a pulse having the magnitude of $\alpha_1 \cdot sf_1$ is performed if $d > d_1$. On the other hand, when the variations of the I and Q signals are in the clockwise direction, pulse insertion using a pulse having the magnitude of $\alpha_2 \cdot sf_2$ is performed if $d > d_2$. Here, $sf_1$ and $sf_2$ are calculated by using (equation 4) below.

$$sf_1 = d - d_1$$

$$sf_2 = d - d_2 \quad \text{(equation 4)}$$

According to this manner, when the variations of the I and Q signals are in the anticlockwise direction, that is, in the direction causing frequency increase, requirements to be satisfied for determining to perform the pulse insertion are less strict than when the variations of the I and Q signals are in the clockwise direction. Accordingly, the high frequency components of the I and Q signals are reduced at a greater degree than the low frequency components thereof.

Thus, by using the nonlinear filter 1201 of the present embodiment, the spectrum as shown in FIG. 6 can be obtained in which the power is less on the higher frequency side with respect to the carrier wave band than on the lower frequency side, in a band near the carrier wave band as well as in a band distant from the carrier wave band. If it is desired that the power is less on the lower frequency side with respect to the carrier wave band than on the higher frequency side, it is only necessary in the above descriptions to replace the anticlockwise direction with the clockwise direction and vice versa.

Fourth Embodiment

Figure 14:
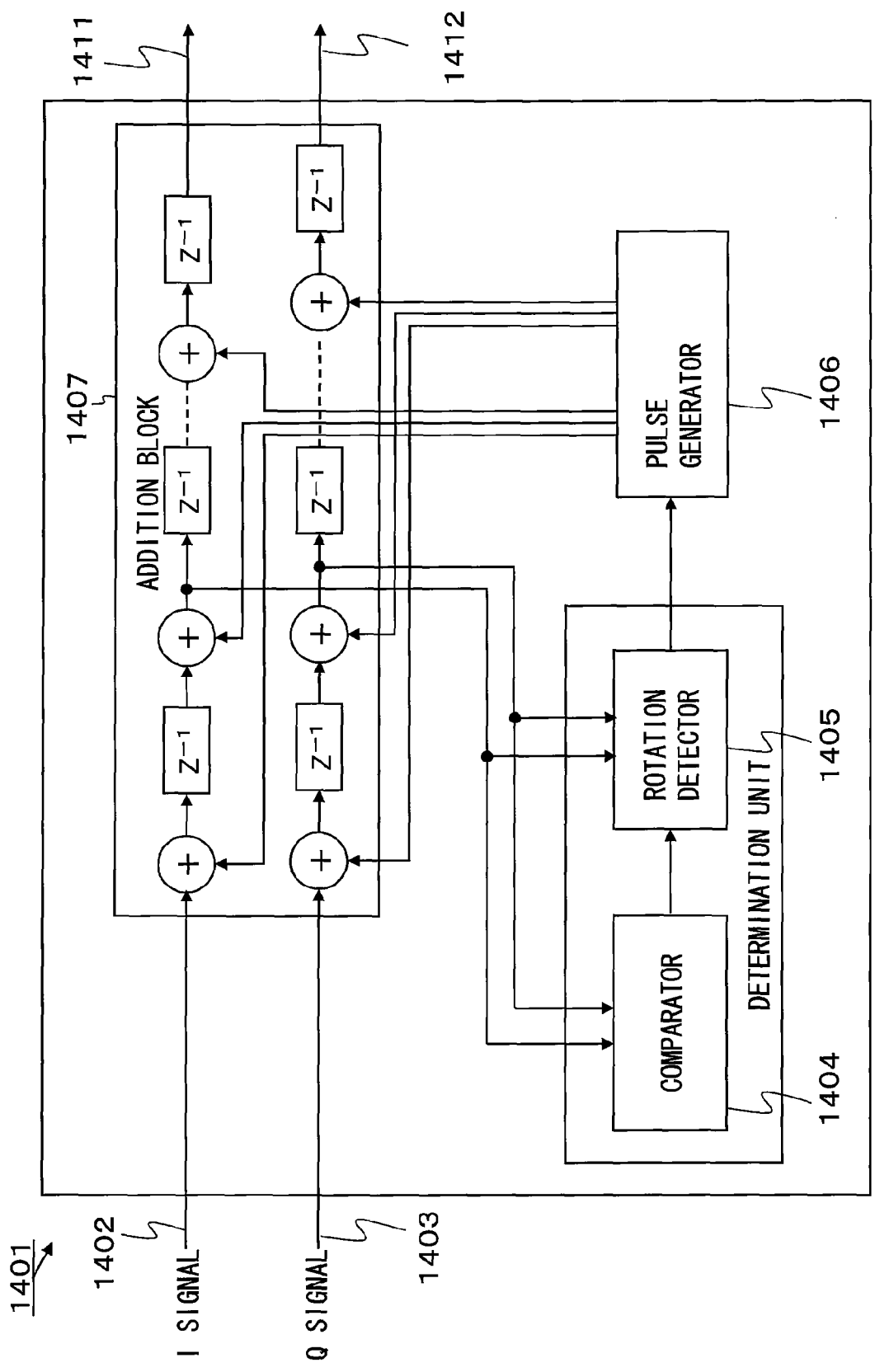
FIG. 14 shows a configuration of a nonlinear filter according to a fourth embodiment of the present invention.

A fourth embodiment of the present invention is described below with reference to FIG. 14. FIG. 14 is a block diagram showing a configuration of a nonlinear filter 1401 according to the present embodiment. Similar to the nonlinear filter 101 according to the first embodiment, the nonlinear filter 1401 includes input lines 1402 and 1403, a comparator 1404, and output lines 1411 and 1412. The nonlinear filter 1401 is different from the nonlinear filter 101 according to the first embodiment in that the nonlinear filter 1401 includes an addition block 1407 in place of the delay unit 107 and the adder 108, the addition block 1407 including multiple adders and multiple delay devices that are alternately connected. Furthermore, the comparator 1404 and a rotation detector 1405 of the nonlinear filter 1401 are different from the comparator 104 and the rotation detector 105 of the first embodiment in that a pulse generator 1406 of the nonlinear filter 1401 generates a pulse for each of the I signal and the Q signal whose delay amounts in the addition block 1407 are different from each other and the comparator 1404 and the rotation detector 1405 receive, as feedback signals, the I and Q signals having the respective delay amounts in the addition block 1407. The disclosure of U.S. patent application Ser. No. 12/482,913 is incorporated herein by reference.

Owing to the above configuration, based on the fed back I and Q signals, the comparator 1404 and the rotation detector 1405 can evaluate the precision of pulse insertion and correct the magnitude and the direction of each pulse to be outputted from the pulse generator 1406. This improves the precision of outputs from the nonlinear filter 1401. For example, when the comparator 1404 and the rotation detector 1405 determine that pulses of sufficient magnitudes have already been added, the addition of pulses can be terminated at the time. Note that the nonlinear filter 601 according to the second embodiment may include the comparator 1404, the rotation detector 1405, and the addition block 1407 of the present embodiment in place of the delay unit 607, the adder 608, and the rotation detector 605. In the present embodiment, the comparator 1404 and the rotation detector 1405 may be collectively referred to as a determination unit.

Fifth Embodiment

Figure 15:
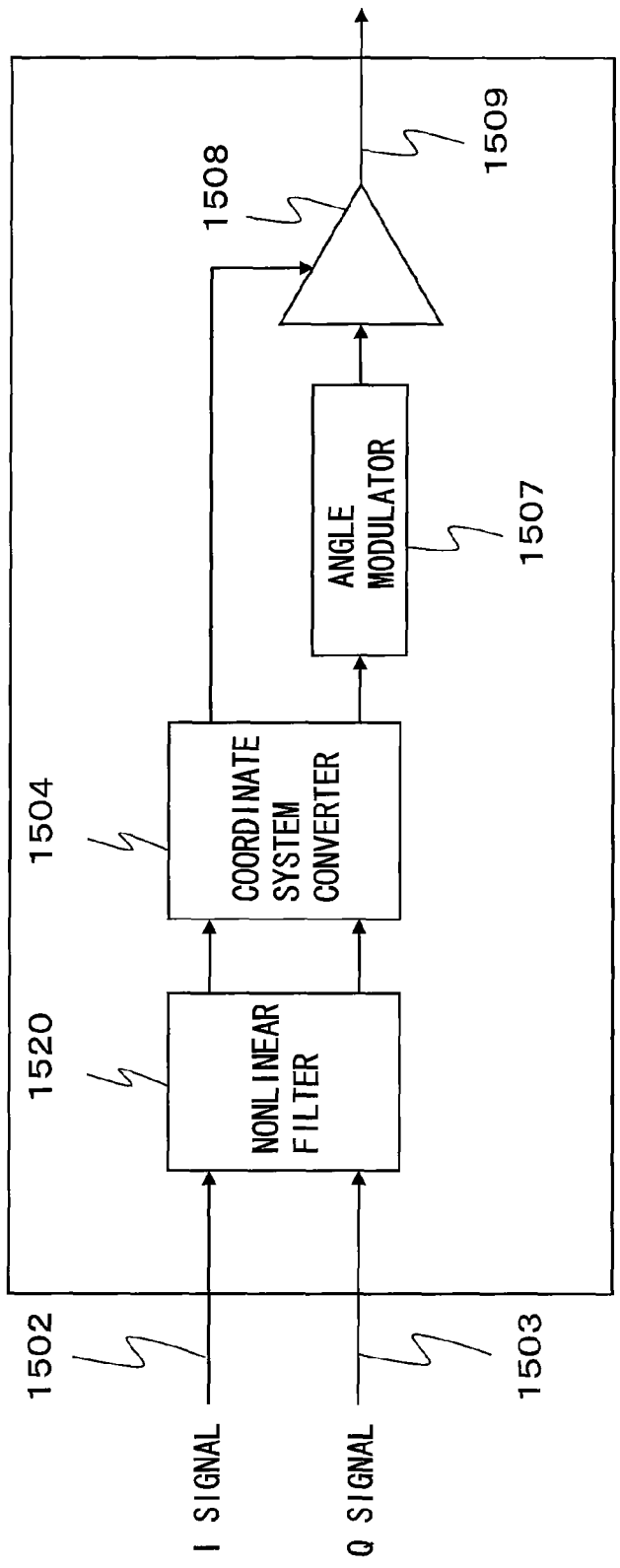
FIG. 15 shows a configuration of a transmission circuit according to a fifth embodiment of the present invention.

A fifth embodiment of the present invention is described below with reference to FIG. 15. FIG. 15 is a block diagram showing a configuration of a transmission circuit 1501 according to the present embodiment. The transmission circuit 1501 includes input terminals 1502 and 1503, a nonlinear filter 1520, a coordinate system converter 1504, an angle modulator 1507, an amplitude modulator 1508, and an output terminal 1509. Although not shown, the transmission circuit

1501 may include a power line for power supply, a controller that performs control for synchronization or the like, and control wiring.

One of the nonlinear filters 101, 601, 1201, and 1401 according to the first to fourth embodiments serves as the nonlinear filter 1520. I and Q signals are inputted into the nonlinear filter 1520 via the input terminals 1502 and 1503, respectively. The nonlinear filter 1520 performs, on the I and Q signals, processing described in one of the above embodiments, and outputs the processed I and Q signals. The coordinate system converter 1504 converts the processed I and Q signals outputted from the nonlinear filter 1520 into an amplitude signal and a phase signal, and outputs these signals. This conversion process uses a CORDIC (Coordinate Rotation Digital Computer), for example. The amplitude signal is inputted into the amplitude modulator 1508. The phase signal is inputted into the angle modulator 1507. The angle modulator 1507 performs angle modulation based on the phase signal to generate an angle-modulated signal. The angle-modulated signal is inputted into the amplitude modulator 1508. Based on the inputted amplitude signal, the amplitude modulator 1508 performs amplitude modulation on the angle-modulated signal to generate a transmission signal, and outputs the transmission signal via the output terminal 1509.

This configuration realizes a transmission circuit capable of uniformly improving distortion reduction characteristics over a range of desired frequencies higher or lower than the carrier wave band. Note that, similar to the conventional transmission circuit 1801, LPFs may be provided at, for example, the output of the coordinate system converter 1804.

Sixth Embodiment

Figure 16:
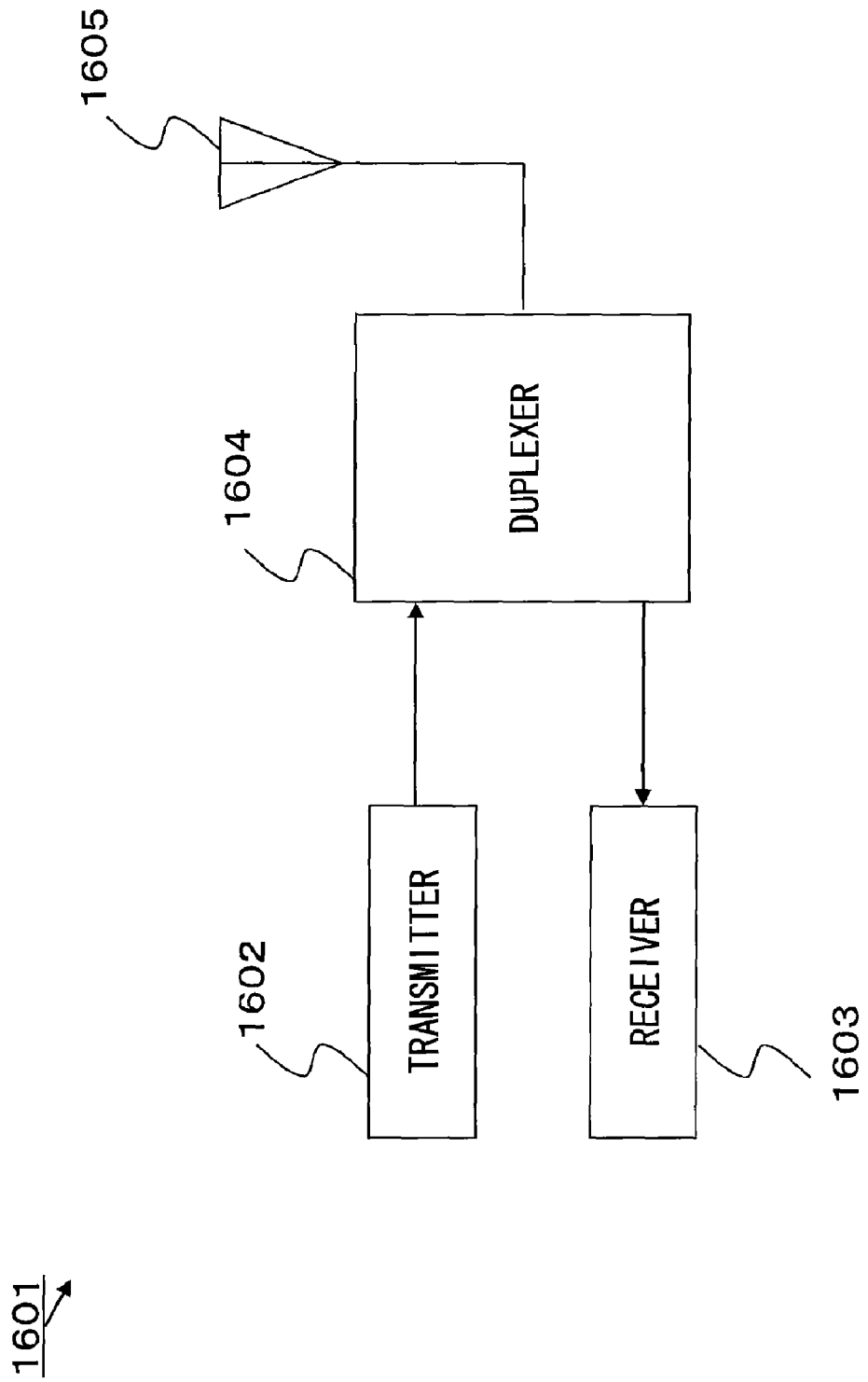
FIG. 16 shows a configuration of a transmission circuit according to a sixth embodiment of the present invention.
Figure 17:
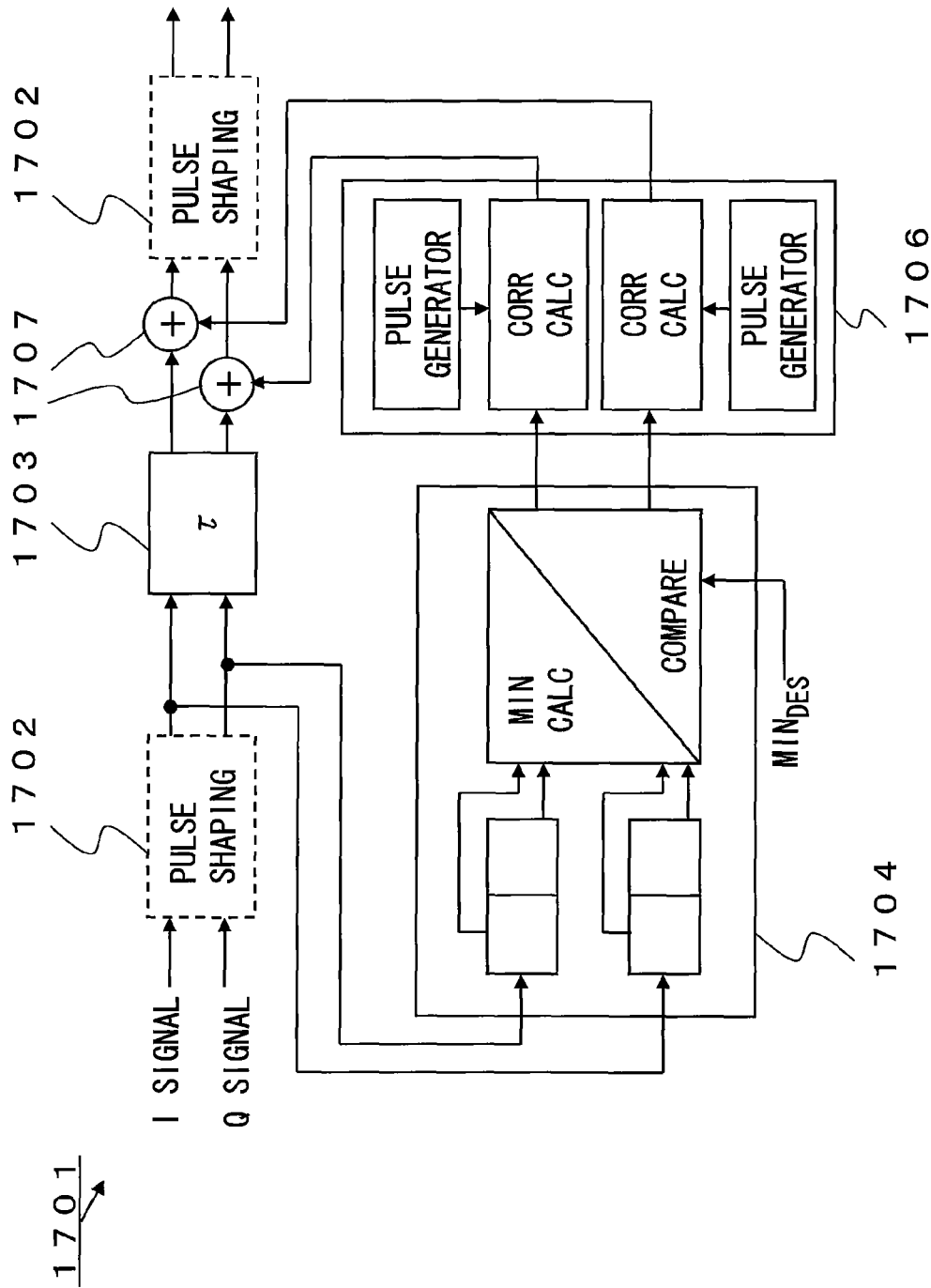
FIG. 17 shows a configuration of a conventional nonlinear filter.
Figure 18:
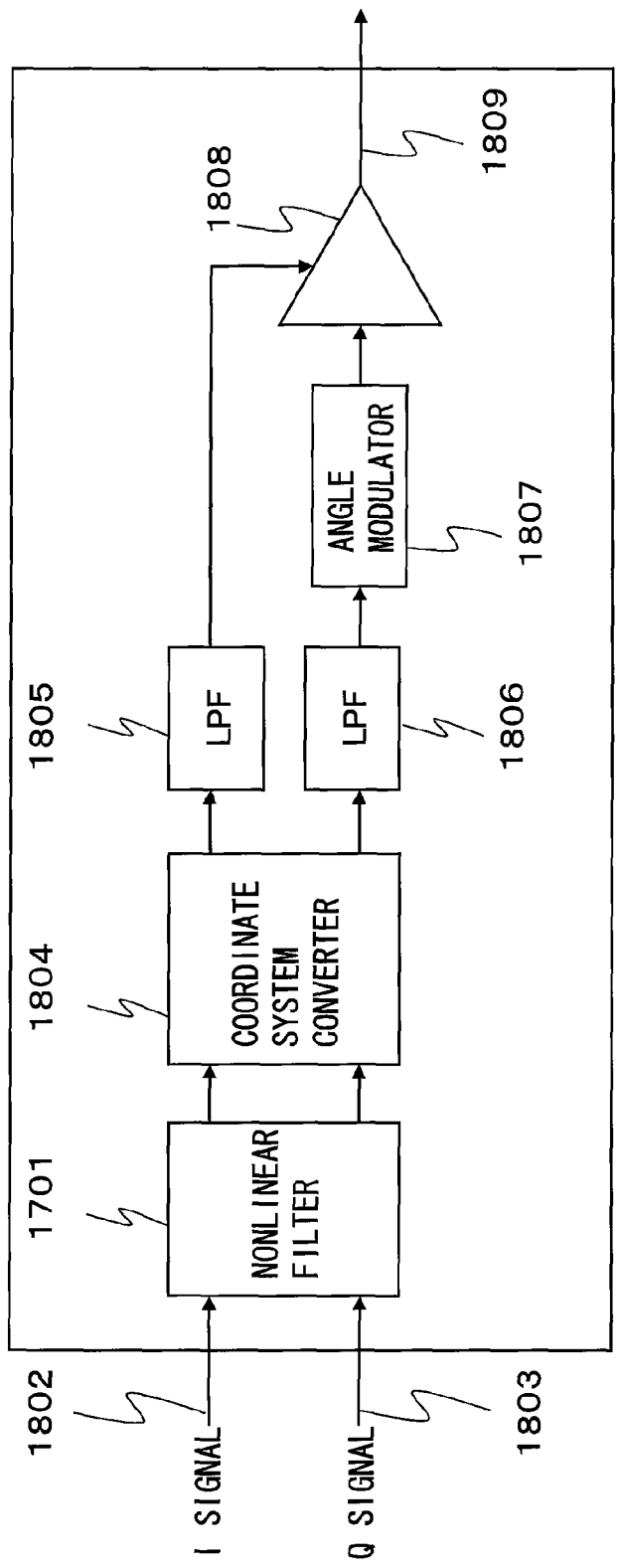
FIG. 18 shows a configuration of a transmission circuit that includes the conventional nonlinear filter.
Figure 19:
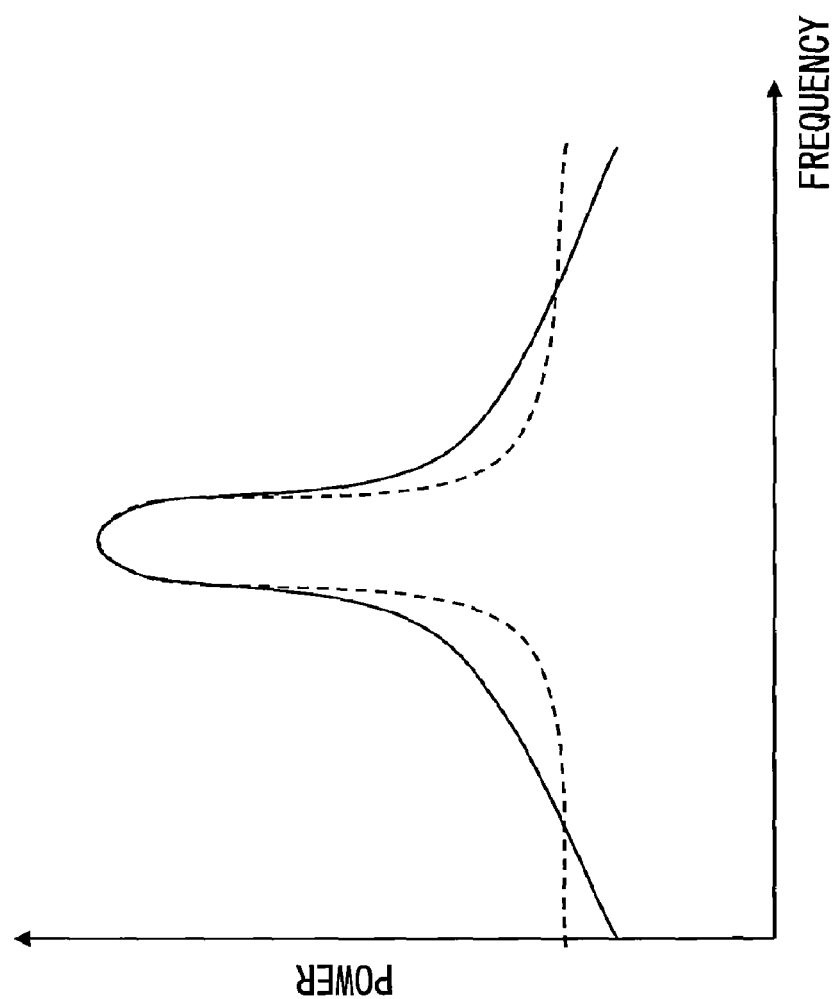
FIG. 19 shows the spectrum of an output from the transmission circuit that includes the conventional nonlinear filter.

A sixth embodiment of the present invention is a radio communication device 1601 that uses the transmission circuit 1501 according to the fifth embodiment as a transmitter 1602. FIG. 16 shows a block configuration of the radio communication device 1601. The radio communication device 1601 includes the transmitter 1602, a receiver 1603, a duplexer 1604, and an antenna 1605. The transmission signal outputted from the transmitter 1602 is inputted into the antenna 1605 via the duplexer 1604, and radiated from the antenna 1605. A reception signal is inputted into the antenna 1605, and inputted into the receiver 1603 via the duplexer 1604. The receiver 1603 demodulates the reception signal. The radio communication device 1601 may include an antenna switch in place of the duplexer 1604.

The components of each of the nonlinear filters 101, 601, 1201, 1401, the transmission circuit 1501, and the radio communication device 1601 according to the embodiments may be partly or entirely realized as an LSI. These components may be realized as a single chip or multiple chips. Although LSI is mentioned here, it may be alternatively referred to as IC, system LSI, super LSI, or ultra LSI, depending on the integration density thereof. Alternatively, the functions of these components may be executed, at least partly, by a CPU, for example. Further, steps to be performed by such a CPU may be stored as a program in a computer readable storage medium. Moreover, in the radio communication device, in order to form the antenna as a phased array antenna, the antenna may be in LSI form. Furthermore, the present invention is also directed to a method for realizing the above-described functions of the transmission circuit.

INDUSTRIAL APPLICABILITY

The present invention is useful for radio communication devices such as mobile phones and wireless LAN devices.

While the invention has been described in detail, the foregoing description is in all aspects illustrative and not restrictive. It will be understood that numerous other modifications and variations can be devised without departing from the scope of the invention.

What is claimed is:

1. A nonlinear filter for inserting, based on an I signal (an in-phase signal) and a Q signal (a quadrature-phase signal) inputted into the nonlinear filter, a pulse into the I signal and the Q signal, and outputting resultant I and Q signals, the nonlinear filter comprising:
   a determination unit that determines, based on the inputted I and Q signals, whether or not to insert a pulse;
   a rotation detector that detects, based on the inputted I and Q signals, a rotation direction of variations of the I and Q signals on an IQ plane with respect to the origin on the IQ plane, wherein the rotation direction is represented based on whether the variations of the I and Q signals are in an anticlockwise direction or in a clockwise direction with respect to the origin on the IQ plane;
   a pulse generator that generates, when the determination unit determines to insert a pulse, a pulse of which at least one of the direction and the magnitude is determined in accordance with at least the detected rotation direction; and
   an adder that inserts the pulse into the inputted I and Q signals and outputs resultant I and Q signals.

2. The nonlinear filter according to claim 1, wherein the determination unit compares magnitudes of the I and Q signals with a predetermined threshold value, and determines based on a result of the comparison whether or not to insert the pulse.

3. The nonlinear filter according to claim 1, wherein the adder is configured to have multiple delay devices and multiple adders therein that are alternately connected, and the determination unit determines whether or not to continue pulse insertion, based on a signal outputted from at least one of the multiple adders.

4. The nonlinear filter according to claim 1, wherein
   in a case where symbols that are obtained by oversampling the I and Q signals indicate a symbol transition from a first symbol to a second symbol, and one of the first and second symbols is, during a predetermined time period, a symbol closest to the origin on the IQ plane and the other one of the first and second symbols is, during the predetermined time period, a symbol second closest to the origin on the IQ plane, and the symbol closest to the origin is present within a circle that centers around the origin and that has a first radius, the determination unit determines to:
   insert, when the detected rotation direction is a first direction, a pulse having a first vector whose starting point is an intersection point of a first straight line passing through the first and second symbols and a second straight line orthogonal to the first straight line and passing through the origin, and whose end point is one of intersection points of the second straight line and the circle having the first radius, which one of the intersection points is closer to the starting point than the other intersection point; and
   insert, when the detected rotation direction is a second direction, a pulse having a second vector whose starting point is the intersection point of the first and second straight lines and whose end point is one of intersection points of the second straight line and a circle that centers around the origin and that has a second radius different from the first radius, which one of the intersection points is closer to the starting point than the other intersection point.

5. The nonlinear filter according to claim 1, wherein in a case where symbols that are obtained by oversampling the I and Q signals indicate a symbol transition from a first symbol to a second symbol, and one of the first and second symbols is, during a predetermined time period, a symbol closest to the origin on the IQ plane and the other one of the first and second symbols is, during the predetermined time period, a symbol second closest to the origin on the IQ plane, the determination unit determines to:

insert, when the symbol closest to the origin is present within a circle that centers around the origin and that has a first radius and the detected rotation direction is a first direction, a pulse having a first vector whose starting point is an intersection point of a first straight line passing through the first and second symbols and a second straight line orthogonal to the first straight line and passing through the origin, and whose end point is one of intersection points of the second straight line and the circle having the first radius, which one of the intersection points is closer to the starting point than the other intersection point; and insert, when the symbol closest to the origin is present within a circle that centers around the origin and that has a second radius different from the first radius and the detected rotation direction is a second direction, a pulse having a second vector whose starting point is the intersection point of the first and second straight lines and whose end point is one of intersection points of the second straight line and the circle having the second radius, which one of the intersection points is closer to the starting point than the other intersection point.

6. The nonlinear filter according to claim 1, wherein in a case where symbols that are obtained by oversampling the I and Q signals indicate a symbol transition from a first symbol to a second symbol, and one of the first and second symbols is, during a predetermined time period, a symbol closest to the origin on the IQ plane and the other one of the first and second symbols is, during the predetermined time period, a symbol second closest to the origin on the IQ plane, and the symbol closest to the origin is present within a circle that centers around the origin and that has a first radius, the determination unit determines to:

insert, when the detected rotation direction is a first direction, a pulse having a first vector whose starting point is an intersection point of a first straight line passing through the first and second symbols and a second straight line orthogonal to the first straight line and passing through the origin, and whose end point is one of intersection points of the second straight line and the circle having the first radius, which one of the intersection points is closer to the starting point than the other intersection point; and insert, when the detected rotation direction is a second direction, a pulse having a second vector whose starting point is the intersection point of the first and second straight lines and whose end point is one of intersection points of the second straight line and the circle having the first radius, which one of the intersection points is more distant from the starting point than the other intersection point.

7. The nonlinear filter according to claim 1, wherein in a case where symbols that are obtained by oversampling the I and Q signals indicate a symbol transition from a first symbol to a second symbol, and one of the first and second symbols is, during a predetermined time period, a symbol closest to the origin on the IQ plane and the other one of the first and second symbols is, during the predetermined time period, a symbol second closest to the origin on the IQ plane, and the symbol closest to the origin is present within a circle that centers around the origin and that has a first radius, the determination unit determines to:

insert, when the detected rotation direction is a first direction, a pulse having a first vector whose starting point is an intersection point of a first straight line passing through the first and second symbols and a second straight line orthogonal to the first straight line and passing through the origin, and whose end point is one of intersection points of the second straight line and the circle having the first radius, which one of the intersection points is closer to the starting point than the other intersection point; and insert, when the detected rotation direction is a second direction, a pulse having a second vector whose starting point is the intersection point of the first and second straight lines and whose end point is one of intersection points of the second straight line and a circle that centers around the origin and that has a second radius different from the first radius, which one of the intersection points is more distant from the starting point than the other intersection point.

8. The nonlinear filter according to claim 1, wherein in a case where symbols that are obtained by oversampling the I and Q signals indicate a symbol transition from a first symbol to a second symbol, and one of the first and second symbols is, during a predetermined time period, a symbol closest to the origin on the IQ plane and the other one of the first and second symbols is, during the predetermined time period, a symbol second closest to the origin on the IQ plane, and a value obtained by dividing a distance between the first and second symbols by a distance, from the origin, of the symbol closest to the origin is greater than a predetermined threshold value, the determination unit determines to:

insert, when the detected rotation direction is a first direction, a pulse having a first vector whose magnitude is a result of subtracting the threshold value from the value obtained by the dividing and then multiplying a predetermined first constant by a value resulting from the subtracting, and whose direction is one of directions orthogonal to a straight line passing through the first and second symbols, which one of the directions is a direction from the origin toward the straight line; and insert, when the detected rotation direction is a second direction, a pulse having a second vector whose magnitude is a result of subtracting the threshold value from the value obtained by the dividing and then multiplying a predetermined second constant different from the first constant by the value resulting from the subtracting, and whose direction is one of the directions orthogonal to the straight line passing through the first and second symbols, which one of the directions is the direction from the origin toward the straight line.

9. The nonlinear filter according to claim 1, wherein in a case where symbols that are obtained by oversampling the I and Q signals indicate a symbol transition from a first symbol to a second symbol, and one of the first and second symbols is, during a predetermined time period, a symbol closest to the origin on the IQ plane and the other one of the first and second symbols is, during the predetermined time period, a symbol second closest to the origin on the IQ plane, the determination unit determines to:
insert, when a value obtained by dividing a distance between the first and second symbols by a distance, from the origin, of the symbol closest to the origin is greater than a predetermined first threshold value and the detected rotation direction is a first direction, a pulse having a first vector whose magnitude is a result of subtracting the first threshold value from the value obtained by the dividing and then multiplying a predetermined first constant by a value resulting from the subtracting, and whose direction is one of directions orthogonal to a straight line passing through the first and second symbols, which one of the directions is a direction from the origin toward the straight line; and
insert, when the value obtained by dividing the distance between the first and second symbols by the distance, from the origin, of the symbol closest to the origin is greater than a predetermined second threshold value different from the first threshold value and the detected rotation direction is a second direction, a pulse having a second vector whose magnitude is a result of subtracting the second threshold value from the value obtained by the dividing and then multiplying a predetermined second constant different from the first constant by a value resulting from the subtracting, and whose direction is one of the directions orthogonal to the straight line passing through the first and second symbols, which one of the directions is the direction from the origin toward the straight line.

10. The nonlinear filter according to claim 1, wherein
in a case where symbols that are obtained by oversampling the I and Q signals indicate a symbol transition from a first symbol to a second symbol, and one of the first and second symbols is, during a predetermined time period, a symbol closest to the origin on the IQ plane and the other one of the first and second symbols is, during the predetermined time period, a symbol second closest to the origin on the IQ plane, and a value obtained by dividing a distance between the first and second symbols by a distance, from the origin, of the symbol closest to the origin is greater than a predetermined threshold value, the determination unit determines to:
insert, when the detected rotation direction is a first direction, a pulse having a first vector whose magnitude is a result of subtracting the threshold value from the value obtained by the dividing and then multiplying a predetermined first constant by a value resulting from the subtracting, and whose direction is one of directions orthogonal to a straight line passing through the first and second symbols, which one of the directions is a direction from the origin toward the straight line; and
insert, when the detected rotation direction is a second direction, a pulse having a second vector whose magnitude is a result of subtracting the threshold value from the value obtained by the dividing and then multiplying a predetermined second constant different from the first constant by the value resulting from the subtracting, and whose direction is one of the directions orthogonal to the straight line passing through the first and second symbols, which one of the directions is a direction from the straight line and away from the origin.

11. The nonlinear filter according to claim 1, wherein
in a case where symbols that are obtained by oversampling the I and Q signals indicate a symbol transition from a first symbol to a second symbol, and one of the first and second symbols is, during a predetermined time period, a symbol closest to the origin on the IQ plane and the other one of the first and second symbols is, during the predetermined time period, a symbol second closest to the origin on the IQ plane, the determination unit determines to:
insert, when a value obtained by dividing a distance between the first and second symbols by a distance, from the origin, of the symbol closest to the origin is greater than a predetermined first threshold value and the detected rotation direction is a first direction, a pulse having a first vector whose magnitude is a result of subtracting the first threshold value from the value obtained by the dividing and then multiplying a predetermined first constant by a value resulting from the subtracting, and whose direction is one of directions orthogonal to a straight line passing through the first and second symbols, which one of the directions is a direction from the origin toward the straight line; and
insert, when a value obtained by dividing the distance between the first and second symbols by the distance, from the origin, of the symbol closest to the origin is greater than a predetermined second threshold value different from the first threshold value and the detected rotation direction is a second direction, a pulse having a second vector whose magnitude is a result of subtracting the second threshold value from the value obtained by the dividing and then multiplying a predetermined second constant different from the first constant by a value resulting from the subtracting, and whose direction is one of the directions orthogonal to the straight line passing through the first and second symbols, which one of the directions is a direction from the straight line and away from the origin.

12. A transmission circuit for modulating an I signal and a Q signal inputted into the transmission circuit to generate a transmission signal, and outputting the transmission signal, the transmission circuit comprising:
the nonlinear filter according to claim 1, into which the I and Q signals are inputted;
a coordinate system converter that converts output signals from the nonlinear filter into a phase signal and an amplitude signal;
an angle modulator that performs angle modulation based on the phase signal and thereby generates an angle-modulated signal; and
an amplitude modulator that performs, based on an amplitude represented by the amplitude signal, amplitude modulation on the angle-modulated signal and thereby generates the transmission signal.

13. A radio communication device comprising:
a transmitter that includes the transmission circuit according to claim 12;
a receiver;
an antenna; and
one of a duplexer and an antenna switch, wherein the transmitter and the receiver are connected to the antenna via the one of the duplexer and the antenna switch.

14. An integrated circuit that integrates, at least partly, functions of the radio communication device according to claim 13, the integrated circuit integrating at least one of:
- a function of the determination unit that determines based on the inputted I and Q signals whether or not to insert the pulse;
- a function of the rotation detector that detects, based on the inputted I and Q signals, a rotation direction of variations of the I and Q signals on the IQ plane with respect to the origin of the IQ plane;
- a function of the pulse generator that generates a pulse in accordance with the detected rotation direction; and
- a function of the adder that inserts the pulse into the inputted I and Q signals and outputs resultant I and Q signals.

15. A method for a processor to perform a nonlinear filtering process on an I signal (an in-phase signal) and a Q signal (a quadrature-phase signal) inputted into the processor, the method comprising:
- a determination step at which the processor determines based on the inputted I and Q signals whether or not to perform pulse insertion;
- a rotation direction detection step at which the processor detects, based on the inputted I and Q signals, a rotation direction of variations of the I and Q signals on an IQ plane with respect to the origin of the IQ plane, wherein the rotation direction is represented based on whether the variations of the I and Q signals are in an anticlockwise direction or in a clockwise direction with respect to the origin on the IQ plane;
- a pulse generation step at which the processor generates a pulse in accordance with the detected rotation direction; and
- an addition step at which the processor inserts the pulse into the inputted I and Q signals, and outputting resultant I and Q signals.

* * * * *